United States Patent
Joy et al.

(10) Patent No.: US 11,542,359 B2
(45) Date of Patent: Jan. 3, 2023

(54) PHOTORESPONSIVE POLYURETHANES

(71) Applicants: Abraham Joy, Copley, OH (US); Kaushik Mishra, Akron, OH (US); Yen-Ming Tseng, Cuyahoga Falls, OH (US)

(72) Inventors: Abraham Joy, Copley, OH (US); Kaushik Mishra, Akron, OH (US); Yen-Ming Tseng, Cuyahoga Falls, OH (US)

(73) Assignee: The University of Akron, Akron, OH (US)

( * ) Notice: Subject to any disclaimer, the term of this patent is extended or adjusted under 35 U.S.C. 154(b) by 414 days.

(21) Appl. No.: 16/325,761

(22) PCT Filed: Aug. 24, 2017

(86) PCT No.: PCT/US2017/048416
§ 371 (c)(1),
(2) Date: Feb. 15, 2019

(87) PCT Pub. No.: WO2018/039453
PCT Pub. Date: Mar. 1, 2018

(65) Prior Publication Data
US 2019/0211135 A1    Jul. 11, 2019

Related U.S. Application Data

(60) Provisional application No. 62/378,915, filed on Aug. 24, 2016.

(51) Int. Cl.
| | | |
|---|---|---|
| C08G 18/66 | (2006.01) |
| C08G 18/48 | (2006.01) |
| C08G 18/75 | (2006.01) |
| C09J 175/08 | (2006.01) |
| C08L 33/14 | (2006.01) |
| C08G 18/28 | (2006.01) |
| C08G 18/10 | (2006.01) |
| C08G 18/32 | (2006.01) |
| C09D 175/08 | (2006.01) |

(52) U.S. Cl.
CPC ......... *C08G 18/6677* (2013.01); *C08G 18/10* (2013.01); *C08G 18/283* (2013.01); *C08G 18/3206* (2013.01); *C08G 18/3218* (2013.01); *C08G 18/4825* (2013.01); *C08G 18/755* (2013.01); *C08L 33/14* (2013.01); *C09D 175/08* (2013.01); *C09J 175/08* (2013.01); *C09J 2301/416* (2020.08)

(58) Field of Classification Search
CPC .. C08F 291/00; C08F 255/02; C08F 293/005; C08L 33/14; C08L 53/00; G01J 1/50
See application file for complete search history.

(56) References Cited

U.S. PATENT DOCUMENTS

| | | | |
|---|---|---|---|
| 9,663,614 B2 * | 5/2017 | Joy | .......................... A61K 8/87 |
| 2013/0017246 A1 | 1/2013 | Tunius | |
| 2014/0323664 A1 | 10/2014 | Joy et al. | |
| 2015/0274885 A1 | 10/2015 | Joy et al. | |

FOREIGN PATENT DOCUMENTS

| | | | |
|---|---|---|---|
| CN | 103204837 | 7/2013 | |
| WO | 9706836 A2 | 2/1997 | |
| WO | 02092712 A1 | 11/2002 | |
| WO | 2013090892 A1 | 6/2013 | |
| WO | WO-2014074845 A1 * | 5/2014 | ........... C07D 311/18 |
| WO | 2015/067833 A1 | 5/2015 | |
| WO | 2016/049029 A1 | 3/2016 | |

OTHER PUBLICATIONS

Ling et al. Coumarin imparts repeated photochemical remendability to polyurethane. Journal of Materials Chemistry (2011), 21 (45), pp. 18373-18380 (Year: 2011).*
Aguirresarobe, R.H., Irusta, L. & Fernandez-Berridi, M.J. UV-light responsive waterborne polyurethane based on coumarin: synthesis and kinetics of reversible chain extension. J Polym Res 21, 505 (2014) (Year: 2014).*
Rivero et al . Synthesis, kinetics of photo-dimerization/photo-cleavage and physical properties of coumarin-containing branched polyurethanes based on polycaprolactones. Express Polymer Letters. 2016;10(2):84-95 (Year: 2016).*
Ling et al. Photo-simulated self-healing polyurethane containing dihydroxyl coumarin derivatives, Polymer, Apr. 20, 2012 (Apr. 20, 2012), vol. 53, p. 2691-2698.
Chamsaz et al. "Photoresponsive polyesters by incorporation of alkoxphenacyl or coumarin chromophores along backbone" Photochemcial & Photobiological Sciences, Dec. 5, 2013 (May 12, 2013), vol. 13, p. 412-421.
WIPO, International Search Report for International Appln. No. PCT/US2017/048416, dated Dec. 21, 2017.
Kathalewar et al., Non-isocyanate polyurethanes: from chemistry to application, RSC Adv., 2013,3, 4110-4129.
Kim et al., Photo-responsive bio-inspired adhesives: facil control of adhesion strength via a photocleavable crosslinker, Polym. Chem. 8, 6300 (2017).

* cited by examiner

*Primary Examiner* — Sanza L. McClendon
(74) *Attorney, Agent, or Firm* — Renner, Kenner, Greive, Bobak, Taylor & Weber

(57) ABSTRACT

A photoresponsive polyurethane including a hard segment, a soft segment, and a photoresponsive group that is selected from a coumarin group or a coumarin derivative and an alkoxyphencyl group or an alkoxyphencyl.

8 Claims, 8 Drawing Sheets

PHOTORESPONSIVE POLYURETHANES

CROSS-REFERENCE TO RELATED APPLICATIONS

The present application claims priority to U.S. Provisional Patent Application No. 62/378,915, filed Aug. 24, 2016, incorporated herein by reference.

FIELD OF THE INVENTION

One or more embodiments are directed to photoresponsive polyurethanes that includes a photoresponsive group.

BACKGROUND OF THE INVENTION

Coatings and adhesives are commonly associated in polyurethane (PU) technology due to the commonality of how systems are manufactured and many of the technology trends. In both cases, a film must be applied to a surface, wet the surface, form an integral film, and adhere to the surface. In terms of raw material, applications and markets, they are as different as people commonly understand their separate uses. More so than any other PU-based technology, coatings and adhesives are formulated systems of which the PU may represent a significant volume, but is often serving as a binder for all the other components put into the system. These additional components are often things such as solvents, solid fillers, pigments and dyes, antioxidants, tougheners, surfactants, coupling agents, coalescing agents, catalysts, defoamers, moisture scavengers, water, plasticizers, and numerous hybridizing polymers. The technologies for producing both adhesives and coatings can be simplified into variations of reactive and unreactive systems.

Materials designed to be responsive to light have several advantages as it involves spatiotemporal control of the polymer in precise and robust manner. Of late, polymers which exhibit both photo-properties have become increasingly desirable. Polymers with such properties could be activated by the photochemical input and at a later stage to modulate the properties to provide a more varied end use.

Coumarin groups have previously been used in synthetic organic chemistry as a tool for orthogonal deprotection. Other uses for coumarin groups include uncaging molecules such as neurotransmitters, as labile groups in solid phase peptide synthesis, for formation of functionalized channels in agarose hydrogels, and in photodegradable scaffolds for tissue engineering.

Alkoxyphenacyl and similar groups have found uses for their photocleaveage properties. Phenacyl groups have previously been used as a phototriggers for the release of phosphates, amino acids, peptides, and carboxylic acids. A similar molecule, acetophenone, and its derivatives have been used as radical photoinitiators

SUMMARY OF THE INVENTION

A first embodiment provides a photoresponsive polyurethane comprising a hard segment, a soft segment, and a photoresponsive group that is selected from a coumarin group or a coumarin derivative and an alkoxyphencyl group or an alkoxyphencyl.

A second embodiment provides a photoresponsive polyurethane as in the first embodiment, where the photoresponsive group is a coumarin group or a coumarin derivative.

A third embodiment provides a photoresponsive polyurethane as in either of the first or second embodiments, where the photoresponsive polyurethane includes a coumarin group or coumarin derivative as part of the hard segment.

A fourth embodiment provides a photoresponsive polyurethane as in any of the first through third embodiments, where the photoresponsive polyurethane includes a coumarin group or coumarin derivatives part of the soft segment.

A fifth embodiment provides a photoresponsive polyurethane as in any of the first through fourth embodiments, where the photoresponsive polyurethane includes a coumarin group or coumarin derivative as a terminating group.

A sixth embodiment provides a photoresponsive polyurethane as in any of the first through fifth embodiments, where the photoresponsive polyurethane includes a coumarin group or a coumarin derivative includes a coumarin or a coumarin derivative defined by the formula:

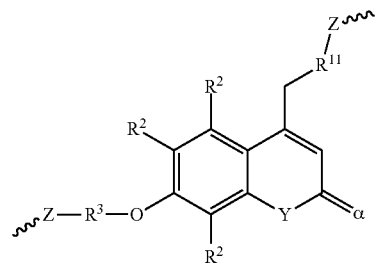

where each $R^2$ is individually a hydrogen atom, a bromine atom, an iodine atom, or an alkoxy group; $R^3$ is an organic group; $R^{11}$ is a bond or an organic group Y is an oxygen atom or a nitrogen atom with an organic substitution; each Z is individually a urethane group or a urea group; and $\alpha$ is an oxygen atom or a sulfur atom.

A seventh embodiment provides a photoresponsive polyurethane as in any of the first through sixth embodiments, where the photoresponsive polyurethane includes a coumarin group or a coumarin derivative includes a coumarin or a coumarin derivative defined by the formula:

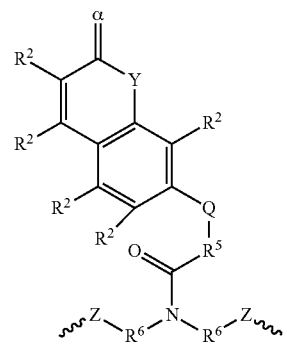

where each $R^2$ is individually a hydrogen atom, a bromine atom, an iodine atom, or an alkoxy group; $R^5$ is a hydrocarbon group; each $R^6$ is individually a hydrocarbon group, Q is an oxygen atom or an amide group; Y is an oxygen atom or a nitrogen atom with an organic substitution; each Z is individually a urethane group or a urea group; and $\alpha$ is an oxygen atom or a sulfur atom.

An eighth embodiment provides a photoresponsive polyurethane as in any of the first through seventh embodiments, where the photoresponsive group is an alkoxyphencyl group or an alkoxyphencyl derivative.

A ninth embodiment provides a photoresponsive polyurethane as in any of the first through eighth embodiments, where the photoresponsive polyurethane includes an alkoxyphencyl group or an alkoxyphencyl derivative as part of the hard segment.

A tenth embodiment provides a photoresponsive polyurethane as in any of the first through ninth embodiments, where the photoresponsive polyurethane includes an alkoxyphencyl group or an alkoxyphencyl derivative as part of the soft segment.

An eleventh embodiment provides a photoresponsive polyurethane as in any of the first through tenth embodiments, where the photoresponsive polyurethane includes an alkoxyphencyl group or an alkoxyphencyl derivative as a terminating group.

A twelfth embodiment provides a photoresponsive polyurethane as in any of the first through eleventh embodiments, where the photoresponsive polyurethane includes an alkoxyphencyl group or an alkoxyphencyl derivative defined by the formula:

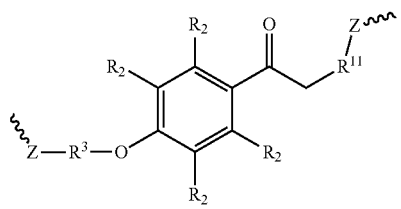

where each $R^2$ is individually a hydrogen atom, a bromine atom, an iodine atom, or an alkoxy group; each Z is individually a urethane group or a urea group; $R^{11}$ is a bond or an organic group and $R^3$ is an organic group.

A thirteenth embodiment provides a photoresponsive polyurethane as in any of the first through twelfth embodiments, where the photoresponsive polyurethane includes an alkoxyphencyl group or an alkoxyphencyl derivative defined by the formula:

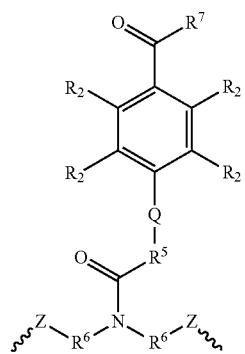

where each $R^2$ is individually a hydrogen atom, a bromine atom, an iodine atom, or an alkoxy group; $R^5$ is a hydrocarbon group; each $R^6$ is individually a hydrocarbon group, $R^7$ is a hydrocarbon group, each Z is individually a urethane group or a urea group and Q is an oxygen atom or an amide group.

A fourteenth embodiment provides a coated article comprising a photoresponsive polyurethane coated on a substrate, wherein the photoresponsive polyurethane comprises a hard segment, a soft segment, and a photoresponsive group that is selected from a coumarin group and an alkoxyphencyl group.

A fifteenth embodiment provides a method of preparing a photoresponsive polyurethane comprising reacting a poly(cylic carbonate) with a polyamine compound, wherein the poly(cylic carbonate), the polyamine compound, or both the poly(cylic carbonate) and the polyamine compound include a photoresponsive group that is selected from a coumarin group and an alkoxyphencyl group.

A sixteenth embodiment provides a method as in the fifteenth embodiment, where the poly(cylic carbonate) is defined by the formula:

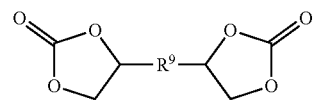

where R9 is an organic group. In one or more embodiments, the organic group, R9, may be a hydrocarbon groups or a substituted hydrocarbon group.

A seventeenth embodiment provides a method as in the fifteenth or sixteenth embodiments, where the poly(cylic carbonate) is defined by the formula:

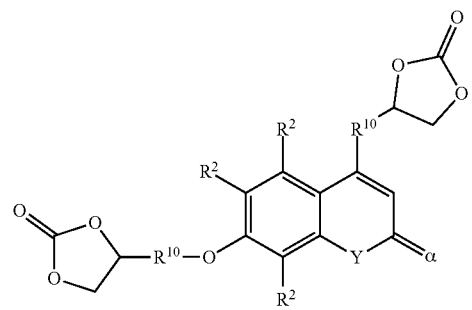

where each R2 is individually a hydrogen atom, a bromine atom, an iodine atom, or an alkoxy group; each R10 is individually an organic group; Y is an oxygen atom or a nitrogen atom with an organic substitution; and α is an oxygen atom or a sulfur atom.

An eighteenth embodiment provides a method as in any of the fifteenth through seventeenth embodiments,

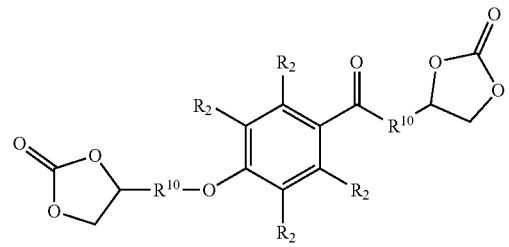

where each R2 is individually a hydrogen atom, a bromine atom, an iodine atom, or an alkoxy group; and each R10 is individually an organic group.

A nineteenth embodiment provides a polyurethane comprising, units derived from a soft segment forming monomer selected from a polyamine and a polyol, units derived from a polyisocyante; units derived from a chain extender selected from polyols, and polyamines, wherein one or more of the soft segment forming monomer, polyisocyante, or the chain extender include a photoresponsive group that is selected from a coumarin group or coumarin derivate and an alkoxyphencyl group or alkoxy deriviative.

A twentieth embodiment provides a polyurethane as in the nineteenth embodiment, where the polyurethane includes units derived from aphotoresponsive coumarin monomer may be defined by the formula:

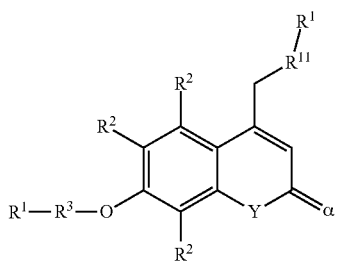

where each $R^1$ is individually an alcohol, an isocyanate, a amine, or a cyclic carbonate group; each $R^2$ is individually a hydrogen atom, a bromine atom, an iodine atom, or an alkoxy group; $R^3$ is an organic group; $R^{11}$ is a bond or an organic group; Y is an oxygen atom or a nitrogen atom with an organic substitution; and $\alpha$ is an oxygen atom or a sulfur atom.

A twentieth embodiment provides a polyurethane as in either the nineteenth or twentieth embodiments, where the polyurethane includes units derived from a photoreactive alkoxyphenacyl monomer is defined by the formula:

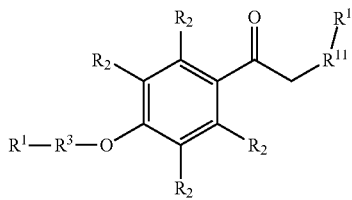

where each $R^1$ is individually an alcohol, an isocyanate, a amine, or a cyclic carbonate group; each $R^2$ is individually a hydrogen atom, a bromine atom, an iodine atom, or an alkoxy group; $R^{11}$ is a bond or an organic group and $R^3$ is an organic group.

DETAILED DESCRIPTION OF ILLUSTRATIVE EMBODIMENTS

Figure 1A:
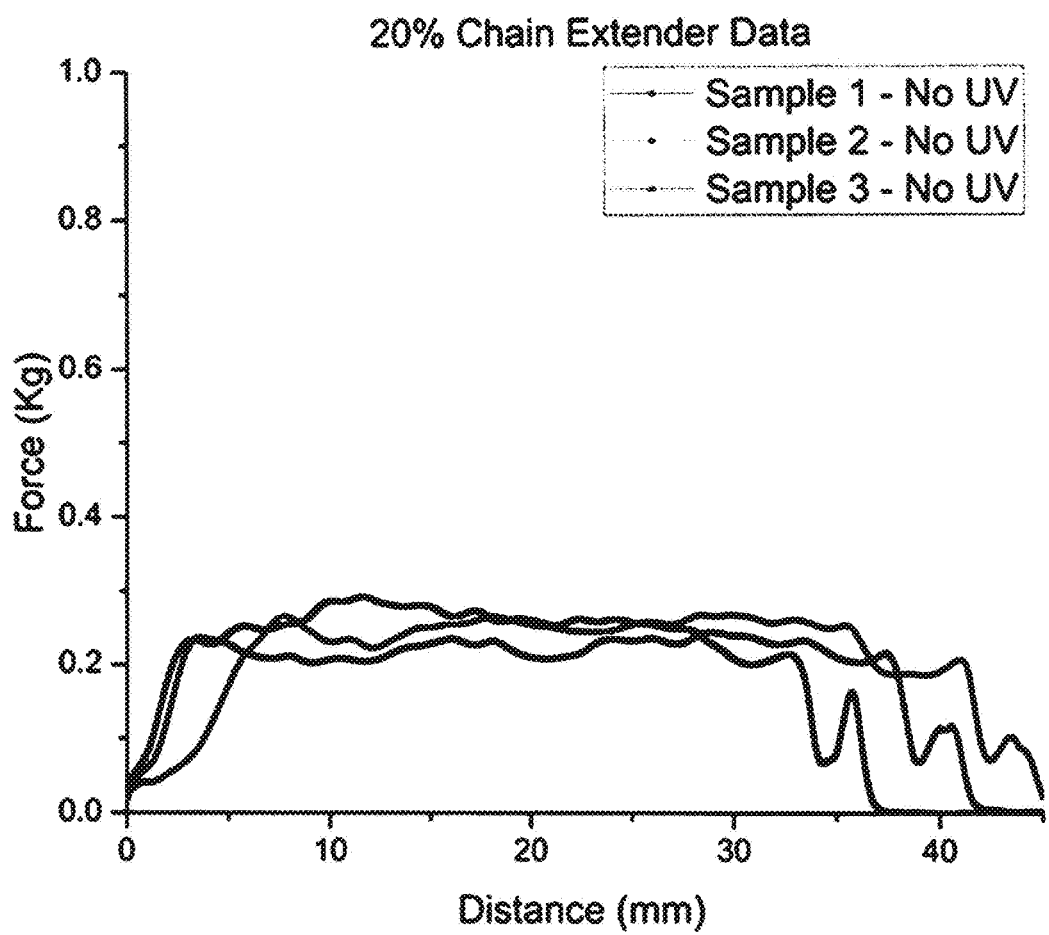
FIG. 1A provides a chart of the peel test data performed in triplicate for a photo responsive polyurethane that includes 20% chain extender prior to UV irradiation.
Figure 1B:
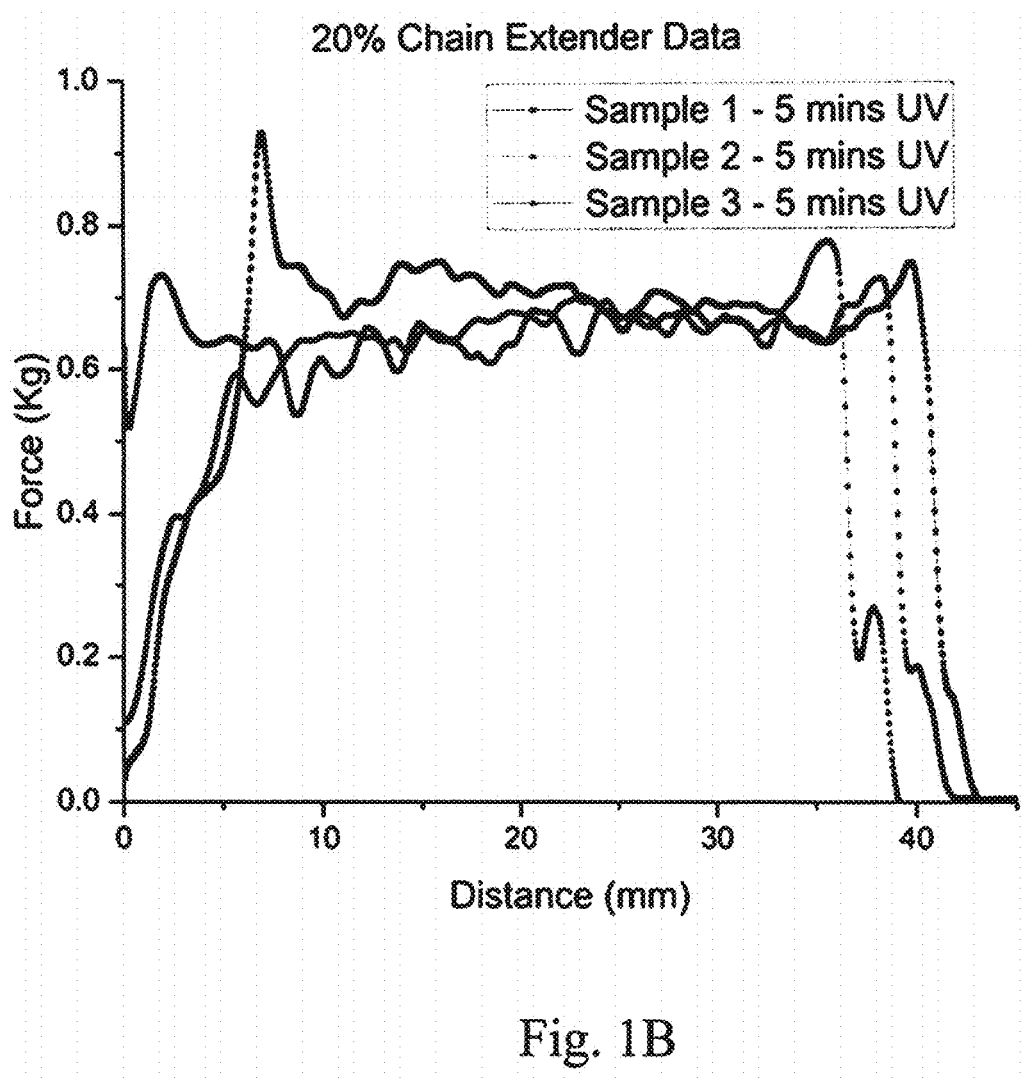
FIG. 1B provides a chart of the peel test data performed in triplicate for a photo responsive polyurethane that includes 20% chain extender after UV irradiation.
Figure 2:
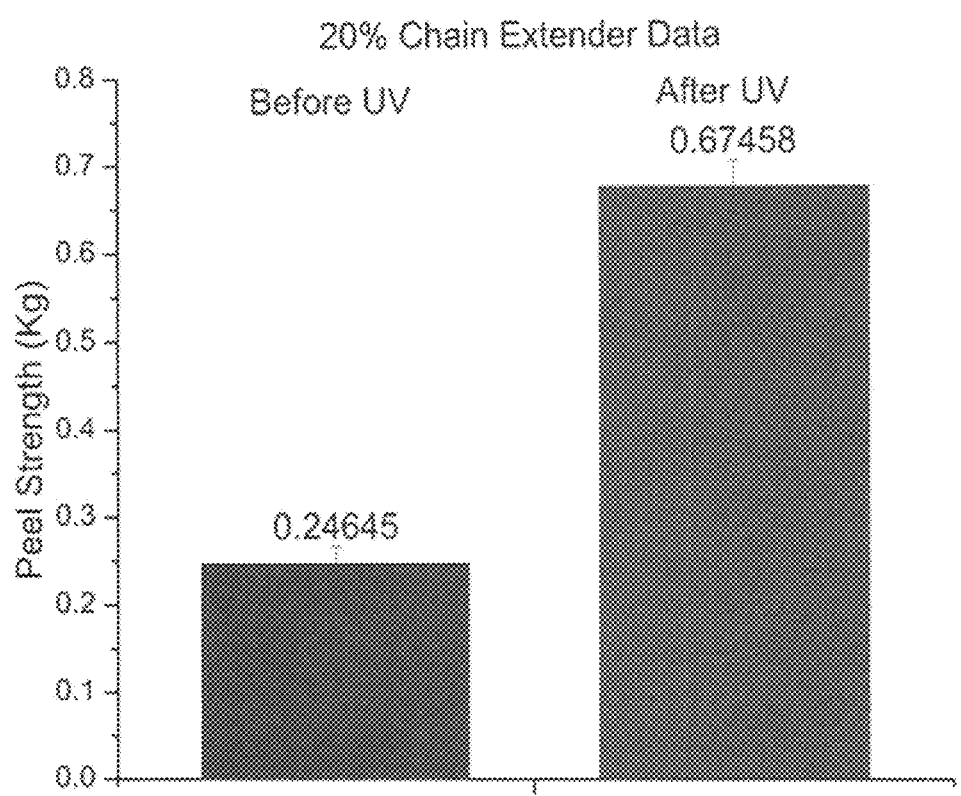
FIG. 2 provides a graph comparing the peel test strength for a photo responsive polyurethane that includes 20% chain extender prior to UV irradiation and after UV irradiation.
Figure 3A:
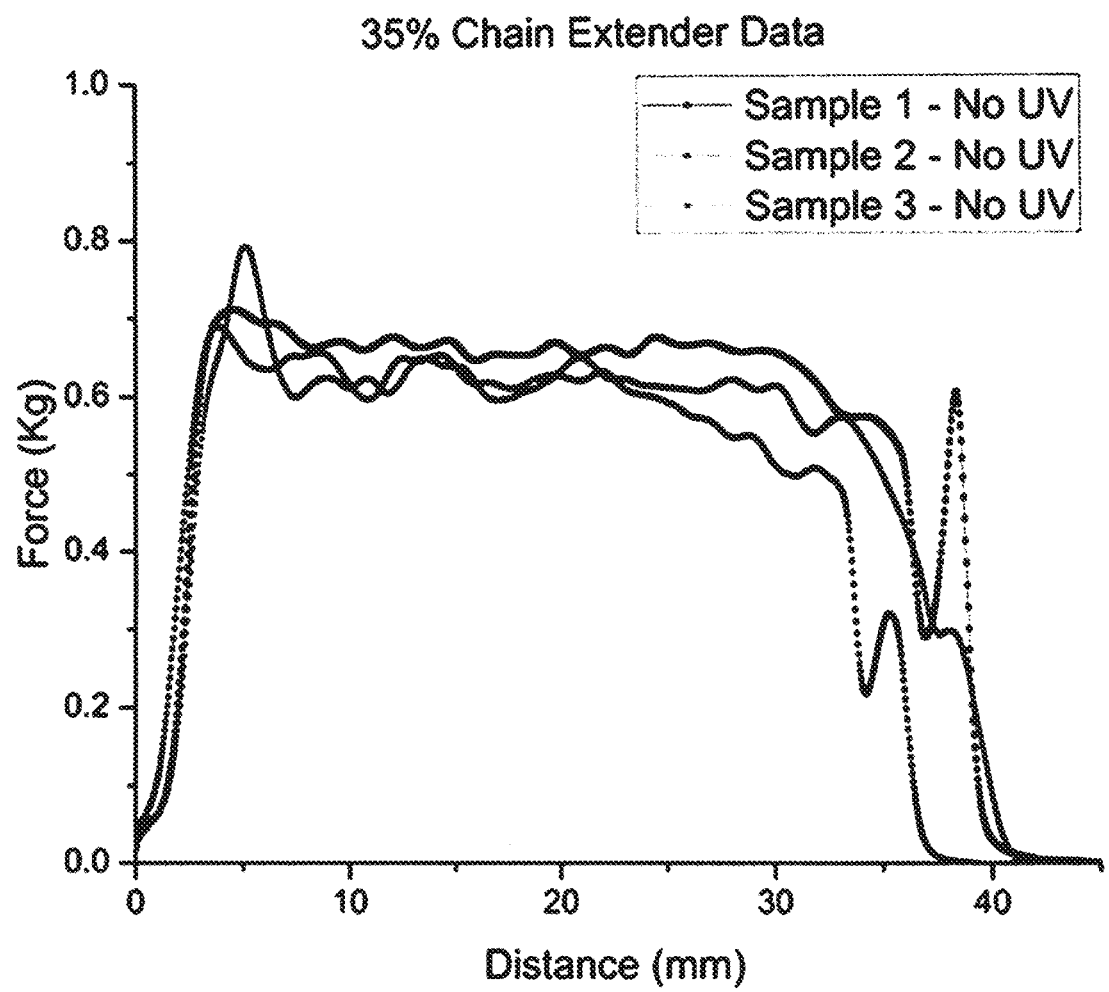
FIG. 3A provides a chart of the peel test data performed in triplicate for a photo responsive polyurethane that includes 35% chain extender prior to UV irradiation.
Figure 3B:
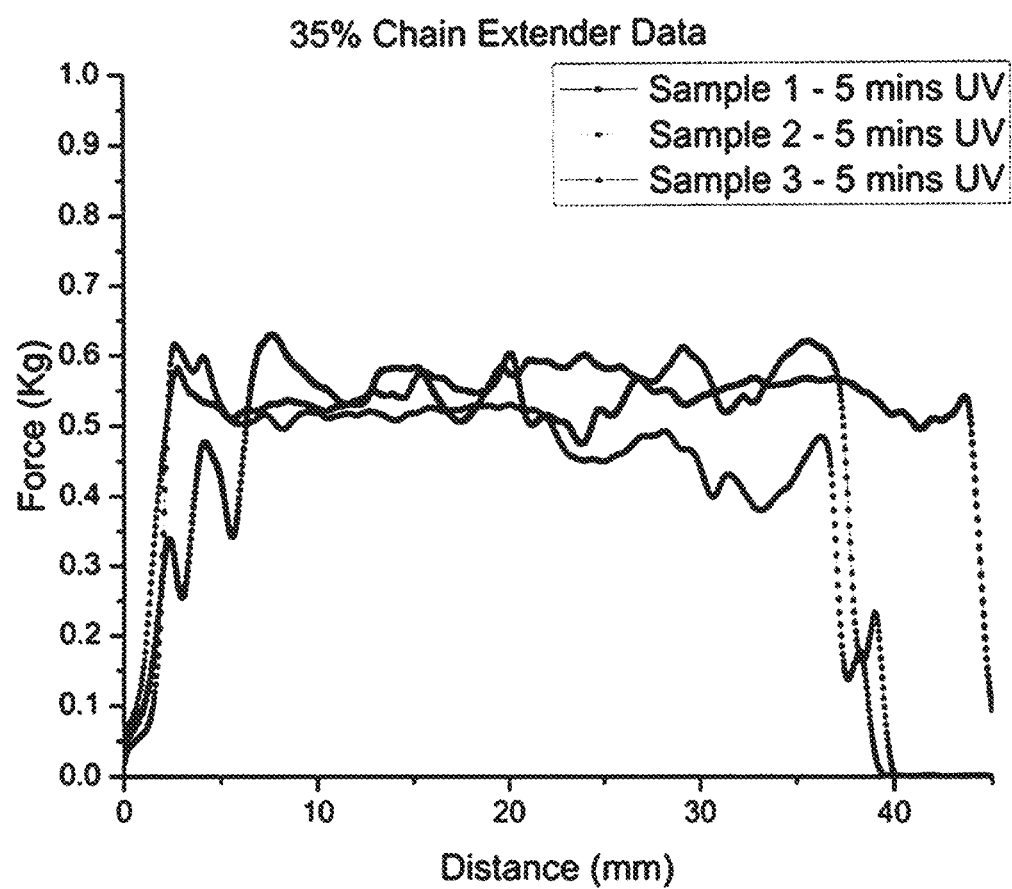
FIG. 3B provides a chart of the peel test data performed in triplicate for a photo responsive polyurethane that includes 35% chain extender after UV irradiation.
Figure 4:
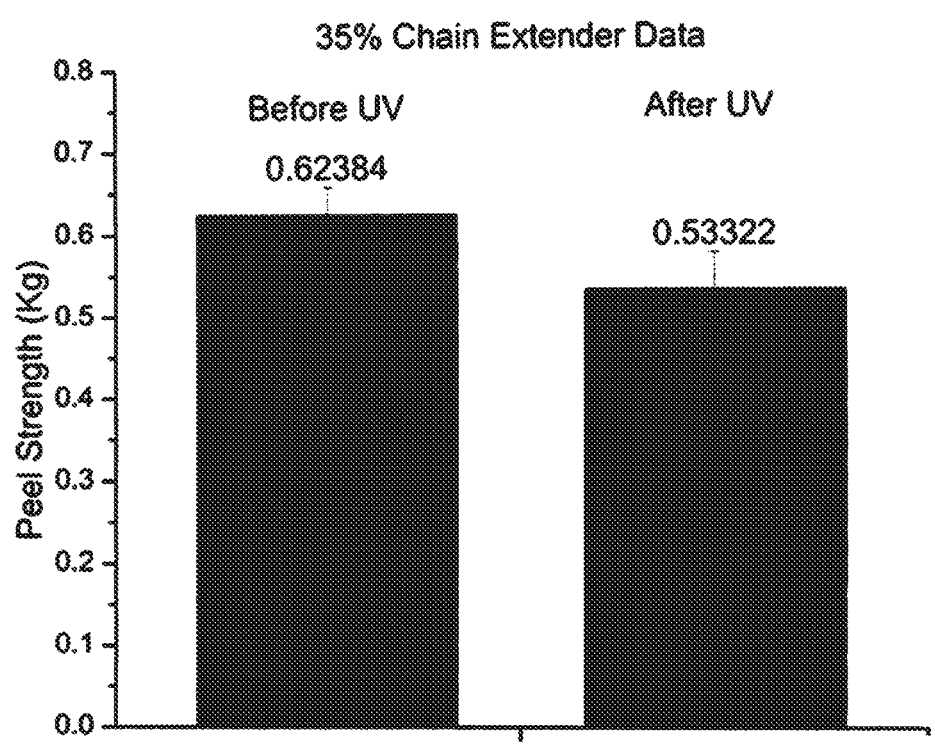
FIG. 4 provides a graph comparing the peel test strength for a photo responsive polyurethane that includes 35% chain extender prior to UV irradiation and after UV irradiation.
Figure 5:
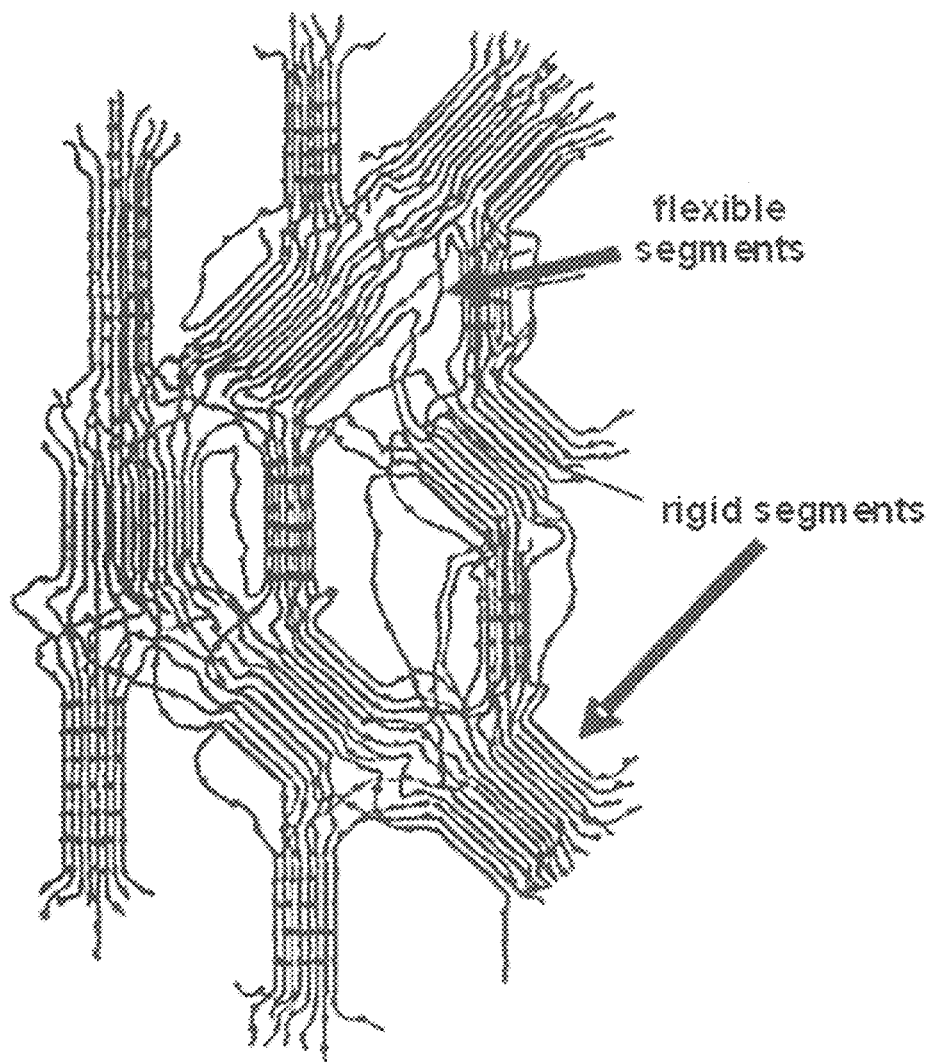
FIG. 5 provides an illustration of a polyurethane with hard (rigid) segments and soft (flexible) segments. The photoresponsive polyurethane is able to spatially and temporally affect physical properties of each of the hard and/or soft segments thus enabling a stimuli responsive material that can specifically tailor the properties using light.
Figure 6:
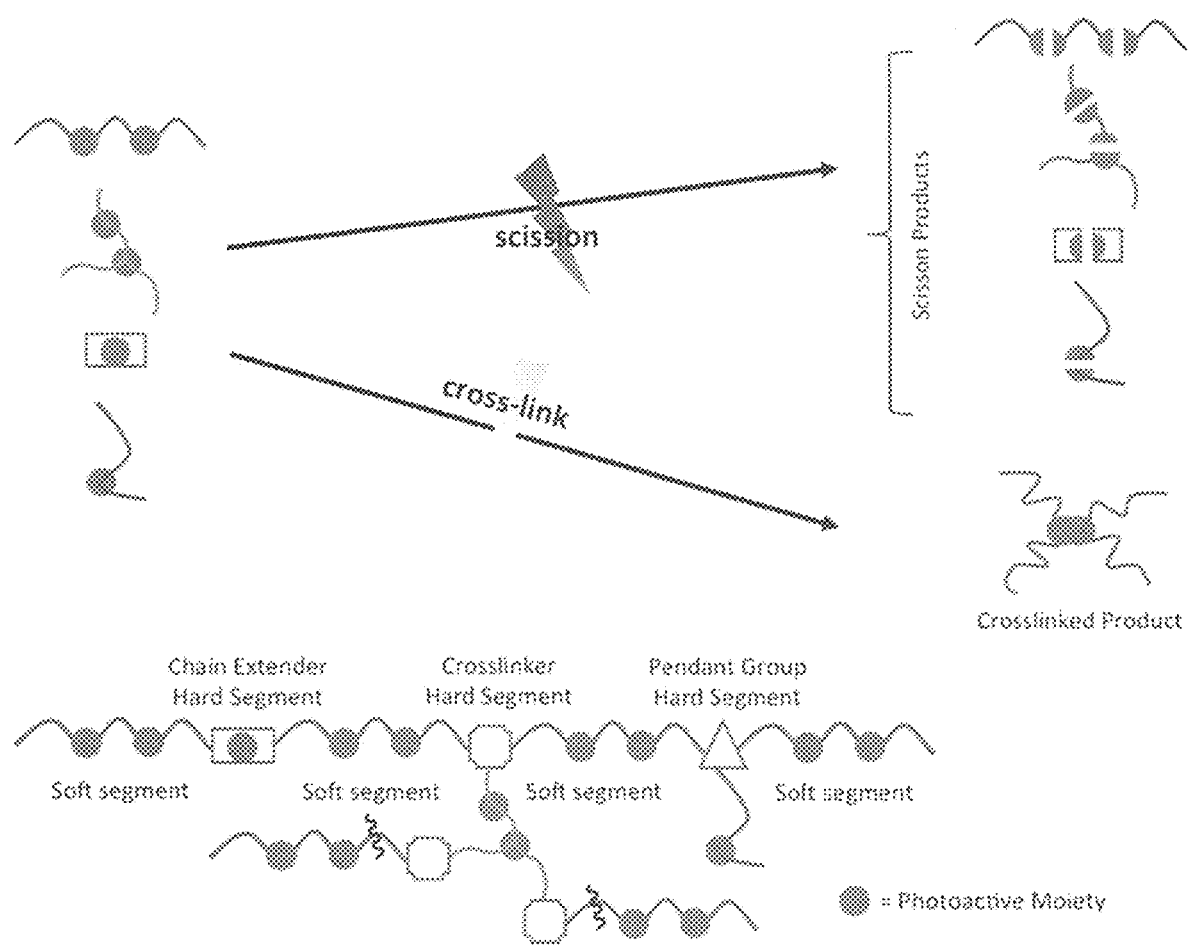
FIG. 6 provides an illustration describing the photoresponsive mechanisms of various embodiments of the photoresponsive polyurethane.

Embodiments are based, at least in part, on the discovery that photoresponsive groups may be included in a polyurethane polymer that includes both segments. For the purpose of this disclosure, a polyurethane polymer that includes a hard segment, a soft segment, and a photoresponsive group may be referred to as photoresponsive polyurethane. Advantageously, it has been found that photoresponsive polyurethanes may be used in adhesives, coatings, and devices. It has been found that the addition of a photoresponsive group into a polyurethane polymer that includes a hard segment and a soft segment allows for the modulation of the separated phases of the polymer resulting varied possibilities for end uses. Specific uses for the photoresponsive polyurethanes include automotive, electronics and film and sheet applications, and medical products such as catheters, wound dressings, bioabsorbable polyurethane, and hydrogels.

As those skilled in the art will appreciate, polyurethanes include polymers that have urethane (also known as carbamate) groups. Suitable methods for making the photoresponsive polyurethanes may be prepared from the reaction of polyisocyanates and polyols which can be chain extended using polyols and/or polyamines, a ring opening reaction of a polycyclic carbonate with a polyamine, direct transformation of amines to urethanes by $CO_2$ insertion, reactions of polycarbamates with polyaldehydes, reaction of polyhydroxamic acid with dimethyl carbonate to yield a latent polyisocyanate, and reactions of hydroxylamine with diphenyl carbonates to form polyurethanes with a phenol byproduct. In one or more embodiments, the photoresponsive polyurethanes may also include the reaction product of polyisocyanates with polyols and water and/or amines. It should be understood that the in some embodiments the preparation of the photoresponsive polyurethane includes both compounds with amine functionalities and isocyanate functionalities, which may react to form a urea (carbamide) group. Unless specifically indicated, for the purpose of this disclosure, polymers that include both urethane and urea groups will be considered polyurethanes. It should also be understood that one or more embodiments include polyurethanes that do not include urea groups.

The photoresponsive groups may be located in one or more locations on the photoresponsive polyurethane. In one or more embodiments, a photoresponsive group may be part of the polymer backbone. In these embodiments, the photoresponsive group connects, and is situated between, two portions of the polymer chain. In one or more embodiments, a photoresponsive group that is part of the polymer backbone may be located in a hard segment, in other embodiments a soft segment, and in other embodiments a photoresponsive group may be located in both a hard segment and a soft segment of the polyurethane. In one or more embodiments, the photoresponsive group may be a pendant group attached through a bond or a connecting group to the polymer backbone. In still other embodiments, the photoresponsive groups may be used as end-termination or functional groups on one or both ends of the polyurethane polymer. In certain embodiments, where the polyurethane is branched, there may be more than two end-termination functional groups. Branched polyurethanes may be prepared using reactants with more than two functionalities. It should be appreciated that embodiments may include polyurethanes that include photoresponsive groups in two or more locations selected from a hard segment, a soft segment, a pendant group, and an end-termination.

In one or more embodiments, a photoresponsive polyurethane may be prepared by using a photoresponsive monomer during the preparation of the photoresponsive polyurethane. A photoresponsive monomer may include a photoresponsive group and one or more reactive groups capable of inclusion into a polyurethane during polymerization. Exemplary groups capable of inclusion into a polyurethane include alcohols, acids, isocyanates, amine, and cyclic carbonate groups. In one or more embodiments, the photoresponsive monomer include 1, in other embodiments 2, and in other embodiments 3 or more reactive groups capable of inclusion into a polyurethane during polymerization.

Suitable photoresponsive groups include groups that may reversibly form dimers or photocleave when exposed to light. Specific examples of photoresponsive groups include coumarin groups and alkoxyphenacyl groups.

In one or more embodiments, the photoresponsive group of the photoresponsive polyurethane may be a coumarin group or a coumarin derivative. Those skilled in the art will appreciate that a coumarin group may be defined by the following formula:

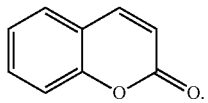 [SMILES: O=c1ccc2ccccc2o1]

Coumarin derivatives are coumarin structural analogs that may include substitutions at either oxygen atom of the base coumarin group. In one or more embodiments, the coumarin derivative may have a sulfur atom substituted for the oxygen atom on the carbonyl carbon of the base coumarin molecule. In these or other embodiments, the coumarin derivative may have a nitrogen atom substituted for the oxygen atom. In one or more embodiments, the coumarin derivative may have a substitution at any of the hydrogen atoms of the base coumarin group. In these or other embodiments, the coumarin derivative may include one or more hydrogen atoms substituted with a bromine atom, an iodine atom, or an alkoxy group.

Coumarin groups and coumarin derivatives are useful in the production of photoresponsive polyurethanes because they may be used to provide a reversible crosslink. Coumarin groups and/or coumarin derivatives are capable of undergoing photodimerization with another coumarin group and/or coumarin derivatives when the photoresponsive polyurethane is irradiated with light. In one or more embodiments, photoresponsive polyurethanes with a coumarin group and/or a coumarin derivative undergo photodimerization when irradiated at a wavelength of about 320 nm to about 420 nm. The dimerization may be reversed by the irradiation of the photoresponsive polyurethane. In one or more embodiments, the dimer of two coumarin groups and/or a coumarin derivatives may separate when irradiated at a wavelength of about 230 nm to about 300 nm.

Photoresponsive coumarin monomers may include a coumarin group or a derivative of a coumarin group. In addition to the coumarin group or coumarin group derivative, a photoresponsive coumarin monomer may include at least one reactive group capable inclusion in a polyurethane during polymerization. Exemplary groups capable of inclusion into a polyurethane include alcohols, acids, isocyanates, amine, and cyclic carbonate groups. In one or more embodiments, the photoresponsive coumarin monomer may include 1, in other embodiments 2, and in other embodiments 3 or more reactive groups capable of inclusion into a polyurethane during polymerization.

In one or more embodiments, a photoresponsive coumarin monomer may be defined by the formula:

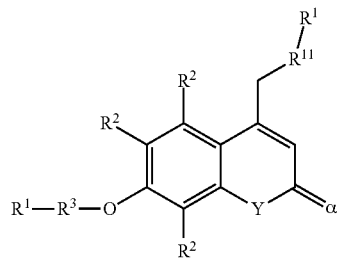

where each $R^1$ is individually an alcohol, an isocyanate, a amine, or a cyclic carbonate group; each $R^2$ is individually a hydrogen atom, a bromine atom, an iodine atom, or an alkoxy group; $R^3$ is an organic group; $R^{11}$ is a bond or an organic group; Y is an oxygen atom or a nitrogen atom with an organic substitution; and $\alpha$ is an oxygen atom or a sulfur atom.

Suitable organic substitutions for the nitrogen atoms with an organic substitution include, hydrocarbon groups with 1 to about 8 carbon atoms. Exemplary hydrocarbon groups include methyl, ethyl, and phenyl groups.

In one or more embodiments, the organic groups, $R^3$ and $R^{11}$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units.

In one or more embodiments, the photoresponsive group of the photoresponsive polyurethane may be an alkoxyphenacyl group. Those skilled in the art will appreciate that an alkoxyphenacyl group may be defined by the following formula:

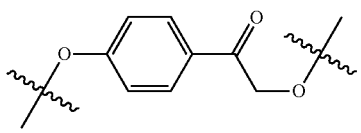

Alkoxyphenacyl derivatives are alkoxyphenacyl structural analogs that may include may have a substitution at any of the hydrogen atoms of the base alkoxyphenacyl group. In these or other embodiments, the alkoxyphenacyl derivate may include one or more hydrogen atoms substituted with a bromine atom, an iodine atom, or an alkoxy group.

Alkoxyphenacyl groups and alkoxyphenacyl derivatives are useful in the production of photoresponsive polyurethanes because they can be used to provide a photocleaveable bond. Alkoxyphenacyl groups and alkoxyphenacyl derivatives are capable of undergoing photocleaveage when the photoresponsive polyurethanes is irradiated with light. In one or more embodiments, photoresponsive polyurethane with an alkoxyphenacyl group undergo photocleaveage when irradiated at a wavelength of about 250 nm to about 350 nm.

Those skilled in the art will appreciate that the photocleaveage of an alkoxyphenacyl groups or an alkoxyphenacyl derivative undergoes using two different pathways which include the Photo-Favorskii reaction to give scission products and radical intermediate formation which would lead to either scission or chain transfer reactions based on the availability of radical scavenging groups. It has been discovered that based upon the structure of the photoresponsive polyurethane and the environment of which the photoresponsive polyurethane resides, the photocleaveage of an alkoxyphenacyl groups or an alkoxyphenacyl derivative will undergo scission to form shorter chains or crosslink with other groups based on the availability of radical scavenging groups.

While not wishing to be bound by any particular theory or method, it is believed that the reaction of the radicals produced by the photocleaveage of an alkoxyphenacyl groups determines the resultant strength of the photoresponsive polyurethane. For example, if the radicals react with a small molecule, such as water or a lower alcohol (an alcohol compound with 1 to 6 carbons) the photocleaveage of an alkoxyphenacyl groups or an alkoxyphenacyl derivative will reduce the strength of the photoresponsive polyurethane. In another example, if the radicals react with the polyurethane backbone in a way that increases crosslinking compared to the photoresponsive polyurethane prior to irradiation, the photocleaveage of an alkoxyphenacyl groups or an alkoxyphenacyl derivative with increase the strength of the photoresponsive polyurethane. Conversely, if the radicals react with the polyurethane backbone in a way that decreases crosslinking or lowers the average molecular weight compared to the photoresponsive polyurethane prior to irradiation, the photocleaveage of an alkoxyphenacyl groups or an alkoxyphenacyl derivative with decrease the strength of the photoresponsive polyurethane.

Photoresponsive alkoxyphenacyl monomers may include an alkoxyphenacyl group or an alkoxyphenacyl derivative. In addition to the alkoxyphenacyl group or the alkoxyphenacyl derivative, a photoresponsive alkoxyphenacyl monomer may include at least one reactive group capable inclusion in a polyurethane during polymerization. Exemplary groups capable of inclusion into a polyurethane include alcohols, acids, isocyanates, amine, and cyclic carbonate groups. In one or more embodiments, the photoresponsive alkoxyphenacyl monomer may include 1, in other embodiments 2, and in other embodiments 3 or more reactive groups capable of inclusion into a polyurethane during polymerization.

In one or more embodiments, the photoreactive alkoxyphenacyl monomer is defined by the formula:

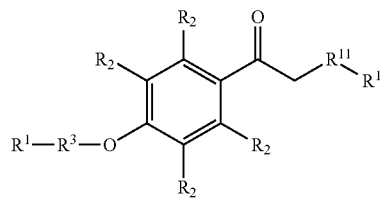

where each $R^1$ is individually an alcohol, an isocyanate, a amine, or a cyclic carbonate group; each $R^2$ is individually a hydrogen atom, a bromine atom, an iodine atom, or an alkoxy group; $R^3$ is an organic group, and $R^{11}$ is a bond or an organic group.

In one or more embodiments, the organic groups, $R^3$ and $R^{11}$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units. Polymeric groups suitable for use as the organic group $R^3$, include hydrocarbon polymers, polyethers, polyacrylates, polycarbonate, and polyesters.

As noted above, the photoresponsive polyurethane include a soft segment and a hard segment. Those skilled in the art appreciate that soft segments have flexible chains with low glass-transition temperatures. Soft segments typical result from the inclusion of long, high molecular weight, diols. Additionally, hard segments are highly polar, rigid blocks with a high concentration of urethane groups. Hard segments typically result from the reaction of the isocyanate and a chain extender.

In one or more embodiments, a photoresponsive polyurethane may prepared by forming a prepolymer by reacting a polyol or a polyamine with a polyisocyanate (optionally in an excess of polyisocyanate), the prepolymer may then be reacted with a chain extender to form the polyurethane polymer. In one or more embodiments, the polyol or polyamine used to form the prepolymer may result in the soft segment of the polyurethane. In these or other embodiments, the monomer that results in the formation of the soft segment may be referred to as the soft-segment forming monomer. A photoresponsive monomer may be introduced as all or part of the polyol, polyamine, polyisocyanate, and/or chain extender. Optionally, a photoresponsive monomer may be added after the chain extender to react with the ends of the polyisocyanate to produce a chain-end functionalization.

The photoresponsive polyurethane may be characterized by the units that derive from the monomers polymerized to prepare the polyurethane. In these or other embodiments, the derived units are the mer units that result from the monomers that have been reacted to form the polyurethane. For example, a photoresponsive polyurethane may be prepared from a polyol, a polyisocyanate, and a chain extender. In these or other embodiments, the photoresponsive polyurethane may comprise units derived from the polyol, units derived from the polyisocyanate, and units derived from the chain extender.

Polyurethanes may be synthesized by one step and by two-step reactions. In one or more embodiments, the polyol, the diisocyanate and the chain extender are combined with a suitable catalyst. In another embodiment, α isocyanate prepolymer is prepared, which is then chain extended in a second step. The two-step methods allows more precise, more reliable and more variable reaction-control, thus a more reproducible final product.

In an exemplary polymerization two moles of diisocyanate with one mole polyol and the final product will be a diisocynate prepolymer (a soft segment with two unreacted isocyanate gropus at each end). The reaction should be performed under dry nitrogen blanket to protect the isocyanate groups from ambient moisture. Once the reaction is complete the chain extender may be added, which reacts with the isocyanate end groups of the prepolymer. Suitable catalysts may be selected based upon the reactivity of the isocynate and of the diol and the chain extender you may need various catalysts.

In these or other embodiments, a polyamine may be used to replace a portion of the polyol.

one or more embodiments, the polyols or polyamines suitable for use in the soft segments may be characterized by calculating the equivalent weight of the polyol, which may be determined by calculating the acid/hydroxyl or amine number. In one or more embodiments, the polyols or polyamines may have an equivalent molecular weight of at least 50 g/mol, in other embodiments at least 250 g/mol, and in other embodiments at least 400 g/mol. In these or other embodiments, the polyols or polyamines may have an equivalent molecular weight of at most 6000 g/mol, in other embodiments at most 2000 g/mol, and in other embodiments at most 1500 g/mol. In one or more embodiments, the polyols or polyamines may have an equivalent molecular molecular weight from about 50 g/mol to about 6000 g/mol, in other embodiments from about 250 g/mol to about 2000 g/mol, and in other embodiments from about 400 g/mol to about 1500 g/mol. In one or more embodiments, the polyols or polyamines suitable for use in the soft segments may be characterized by a glass transition temperature (Tg), which may be determined by differential scanning calorimetry (DSC). In one or more embodiments, the polyols or polyamines may have a glass transition temperature weight of at least −50° C. in other embodiments at least −10° C., and in other embodiments at least 30° C. In these or other embodiments, the polyols or polyamines may have a glass transition temperature of at most 200° C., in other embodiments at most 100° C., and in other embodiments at most 70° C. In one or more embodiments, the polyols or polyamines may have a glass transition temperature from about −50° C. to about 200° C., in other embodiments from about −10° C. to about 100° C., and in other embodiments from about 30° C. to about 70° C.

Typically the polyols used to form the prepolymer result in the soft segment of the photoresponsive polyurethane. These polyols may be referred to as soft-segment forming polyols. In one or more embodiments, the polyols suitable for use in the soft segment have 2 alcohol groups (which may also be referred to as a diol), in other embodiments the polyols have 3 alcohol groups, and in other embodiments polyols have 4 or more alcohol groups.

Suitable polyols that may be used in the soft segment include hydrocarbon polyols, polyether polyols, polyacrylate polyols, polycarbonate polyols, polyester polyols, and combinations thereof.

Exemplary hydrocarbon polyols include rubber diols such as polydienes. Polydienes include polybutadiene and polyisoprene.

Exemplary polyether polyols include polyether diols such as polytetrahydrofuran, polypropylene oxide glycol, and polybutylene oxide glycol.

Exemplary polyester polyols include poly(ethylene glutarate), poly(ethylene adipate), poly(ethylene azelate), poly (trimethylene glutarate), poly(tetramethylene glutarate), poly(pentamethylene glutarate), poly(diethylene glutarate), poly(diethylene adipate), poly(triethylene adipate), and poly (1,2-propylene adipate).

In one or more embodiments, the polyols suitable for use in the soft segment may be a diol defined by the formula:

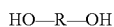

HO—R—OH where R is an organic group. In one or more embodiments, the organic group, R, of the diol suitable for use in the soft segment may be a polymeric groups. Polymeric groups suitable for use as the organic group R, include hydrocarbon polymers, polyethers, polyacrylates, polycarbonate, and polyesters. In these or other embodiments, the polymeric group may have from about 2 to about 100 repeating mer units. In these or other embodiments, the organic group, R, of the diol suitable for use in the soft segment may characterized by an equivalent molecular weight. In these or other embodiments, the organic group, R, of the diol suitable for use in the soft segment may have an equivalent molecular weight from about 50 g/mol to about 6000 g/mol.

In one or more embodiments, a diol defined by the formula above may be selected from the group consisting of HO—(CH$_2$CHCHCH$_2$)$_n$—OH, HO—(CH$_2$CH$_2$CH$_2$CH$_2$O)$_n$—H, H—[OCH$_2$CH(CH$_2$)]$_n$—OH, H—[OCH$_2$CH(CH$_2$CH$_2$)]$_n$—OH, HO—[CH$_2$CH$_2$C(O)OCH$_2$CH$_2$CH$_2$C(O)O]$_n$—H, HO—[CH$_2$CH$_2$C(O)OCH$_2$CH$_2$CH$_2$CH$_2$C(O)O]$_n$—H, HO—[CH$_2$CH$_2$C(O)OCH$_2$CH$_2$CH$_2$CH$_2$CH$_2$CH$_2$C(O)O]$_n$—H, HO—[CH$_2$CH$_2$CH$_2$C(O)OCH$_2$CH$_2$CH$_2$C(O)O]$_n$—H, HO—[CH$_2$CH$_2$CH$_2$CH$_2$C(O)OCH$_2$CH$_2$CH$_2$C(O)O]$_n$—H, HO—[CH$_2$CH$_2$OCH$_2$CH$_2$C(O)OCH$_2$CH$_2$CH$_2$C(O)O]$_n$—H, HO—[CH$_2$CH$_2$OCH$_2$CH$_2$C(O)OCH$_2$CH$_2$CH$_2$CH$_2$C(O)O]$_n$—H, HO—[CH$_2$CH$_2$O)$_2$CH$_2$CH$_2$C(O)OCH$_2$CH$_2$CH$_2$CH$_2$C(O)O]$_n$—H, and HO—[CH$_2$C(CH$_3$)H(O)OCH$_2$CH$_2$CH$_2$CH$_2$C(O)O]$_n$—H. In one or embodiments, n may be from about 3 to about 100, in other embodiments from about 10 to about 50, and in other embodiments from about 20 to about 40.

As noted above, in some embodiments, a photoresponsive group may be included in soft-segment forming polyol monomer. In one or more embodiments, a photoresponsive coumarin monomer suitable for use as a soft-segment forming diol monomer may defined by the formula:

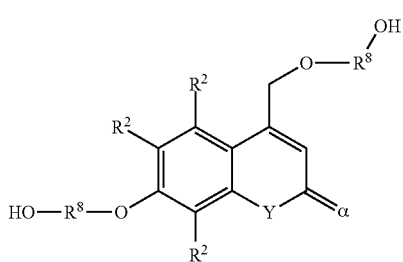

where each $R^2$ is individually a hydrogen atom, a bromine atom, an iodine atom, or an alkoxy group; each $R^8$ is individually an organic group; Y is an oxygen atom or a nitrogen atom with an organic substitution; and α is an oxygen atom or a sulfur atom.

In one or more embodiments, the organic group, $R^8$, is a polymeric group. The polymeric group may be a hydrocarbon group or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. In one or more embodiments the polymeric group may include 2 to about 100 repeating mer units, in other embodiments 10 to about 75 mer units, and in other embodiments 20 to about 50 mer units. Polymeric groups suitable for use as the organic group $R^8$, include hydrocarbon polymers, polyethers, polyacrylates, polycarbonates, and polyesters.

In one or more embodiments, a photoresponsive alkoxyphenacyl monomer suitable for use as a soft-segment forming diol monomer may defined by the formula:

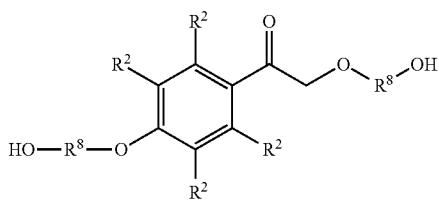

where each $R^2$ is individually a hydrogen atom, a bromine atom, an iodine atom, or an alkoxy group; each $R^8$ is individually an organic group.

In one or more embodiments, the organic group, $R^8$, is a polymeric group. The polymeric group may be a hydrocarbon group or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. In one or more embodiments the polymeric group may include 2 to about 100 repeating mer units, in other embodiments 10 to about 75 mer units, and in other embodiments 20 to about 50 mer units. Polymeric groups suitable for use as the organic group $R^8$, include hydrocarbon polymers, polyethers, polyacrylates, polycarbonates, and polyesters.

Typically the polyamines used to form the prepolymer result in the soft segment of the photoresponsive polyurethane. These polyamines may be referred to as soft-segment forming polyamines. In one or more embodiments, the polyamines suitable for use in the soft segment have 2 amine groups (which may also be referred to as a diamine), in other embodiments the polyamines have 3 amine groups, and in other embodiments polyamines have 4 or more amine groups.

Suitable polyamines that may be used in the soft segment include hydrocarbon polyamines, polyether polyamines, polyacrylate polyamines, polycarbonate polyamines, polyester polyamines, and combinations thereof.

Exemplary hydrocarbon polyamines include rubber diamines such as polydienes. Polydienes include polybutadiene and polyisoprene.

Exemplary polyether polyamines include polyether with two terminal amine groups prepared from polyether such as, polypropylene oxide glycol, and polybutylene oxide glycol.

Exemplary polyester polyamines include polyesters with two terminal amine groups prepared from polyesters such as poly(ethylene glutarate), poly(ethylene adipate), poly(ethylene azelate), poly(trimethylene glutarate), poly(tetramethylene glutarate), poly(pentamethylene glutarate), poly(diethylene glutarate), poly(diethylene adipate), poly(triethylene adipate), and poly(1,2-propylene adipate).

In one or more embodiments, the polyamines suitable for use in the soft segment may be a diamine defined by the formula:

$$H_2N-R-NH_2$$

where R is an organic group. In one or more embodiments, the organic group, R, of the diamine suitable for use in the soft segment may be a polymeric groups. Polymeric groups suitable for use as the organic group R, include hydrocarbon polymers, polyethers, polyacrylates, polycarbonate, and polyesters. In these or other embodiments, the polymeric group may have from about 2 to about 100 repeating mer units. In these or other embodiments, the organic group, R, of the dimaine suitable for use in the soft segment may characterized by an equivalent molecular weight. In these or other embodiments, the organic group, R, of the diamine suitable for use in the soft segment may have an equivalent molecular weight from about 100 g/mol to about 6,000 g/mol.

Those skilled in the art will appreciate that diamines may be prepare from a diol may reacting each hydroxyl group of the diol with a linking group that terminates in an amine. In these or embodiments, the polyamines suitable for use in the soft segment may be a diamine defined by the formula:

$$H_2N-R'-Z-R-Z-R'-NH_2$$

where R is an organic group, each R' is individually an organic group, and each Z is individually an ester, amide, or an either group. In one or more embodiments, the organic group, R, of the diamine suitable for use in the soft segment may be a polymeric groups. Polymeric groups suitable for use as the organic group R, include hydrocarbon polymers, polyethers, polyacrylates, polycarbonate, and polyesters. In these or other embodiments, the polymeric group may have from about 2 to about 100 repeating mer units. In these or other embodiments, the organic group, R, of the diamine suitable for use in the soft segment may characterized by an equivalent molecular molecular weight. In these or other embodiments, the organic group, R, of the diamine suitable for use in the soft segment may have an equivalent molecular molecular weight from about 100 g/mol to about 6,000 g/mol.

In one or more embodiments, a diamine defined by the formula above may be selected from the group consisting of $H_2N-(CH_2CH_2CH_2CH_2O)_n-H$, $HN_2CH_2CH(CH_2)-[OCH_2CH(CH_2)]_n-NH_2$, $HN_2$ $CH_2CH(CH_2CH_2)-$

[OCH$_2$CH(CH$_2$CH$_2$)]$_n$—HN$_2$, HN$_2$—[CH$_2$CH$_2$C(O)OCH$_2$CH$_2$CH$_2$C(O)O]$_n$—CH$_2$CH$_2$C(O)OCH$_2$CH$_2$CH$_2$C(O)HN$_2$, HN$_2$—[CH$_2$CH$_2$C(O)OCH$_2$CH$_2$CH$_2$CH$_2$C(O)O]$_n$—CH$_2$CH$_2$C(O)OCH$_2$CH$_2$CH$_2$CH$_2$C(O)HN$_2$, HN$_2$—[CH$_2$CH$_2$C(O)OCH$_2$CH$_2$CH$_2$CH$_2$CH$_2$CH$_2$C(O)O]—CH$_2$CH$_2$C(O)OCH$_2$CH$_2$CH$_2$CH$_2$CH$_2$CH$_2$C(O)HN$_2$, HN$_2$—[CH$_2$CH$_2$CH$_2$C(O)OCH$_2$CH$_2$CH$_2$C(O)O]$_n$—CH$_2$CH$_2$CH$_2$C(O)OCH$_2$CH$_2$CH$_2$C(O)HN$_2$, [CH$_2$CH$_2$CH$_2$CH$_2$C(O)OCH$_2$CH$_2$CH$_2$C(O)O]$_n$—CH$_2$CH$_2$CH$_2$CH$_2$C(O)OCH$_2$CH$_2$CH$_2$C(O)HN$_2$, HN$_2$—[CH$_2$CH$_2$OCH$_2$CH$_2$C(O)OCH$_2$CH$_2$CH$_2$C(O)O]$_n$—CH$_2$CH$_2$OCH$_2$CH$_2$C(O)OCH$_2$CH$_2$CH$_2$C(O)HN$_2$, HN$_2$—[(CH$_2$CH$_2$OCH$_2$CH$_2$C(O)OCH$_2$CH$_2$CH$_2$CH$_2$C(O)O]$_n$—CH$_2$CH$_2$OCH$_2$CH$_2$C(O)OCH$_2$CH$_2$CH$_2$CH$_2$C(O)HN$_2$, and HN$_2$—[CH$_2$CH$_2$O)$_2$CH$_2$CH$_2$C(O)OCH$_2$CH$_2$CH$_2$CH$_2$C(O)O]$_n$—CH$_2$CH$_2$O)$_2$CH$_2$CH$_2$C(O)OCH$_2$CH$_2$CH$_2$CH$_2$COHN$_2$, and HN$_2$—[CH$_2$C(CH$_3$)H(O)OCH$_2$CH$_2$CH$_2$CH$_2$C(O)O]$_n$—CH$_2$C(CH$_3$)H(O)OCH$_2$CH$_2$CH$_2$CH$_2$C(O) HN$_2$. In one or embodiments, n may be from about 3 to about 100, in other embodiments from about 10 to about 50, and in other embodiments from about 20 to about 40.

As noted above, in some embodiments, a photoresponsive group may be included in soft-segment forming polyamine monomer. In one or more embodiments, a photoresponsive coumarin monomer suitable for use as a soft-segment forming diamine monomer may defined by the formula:

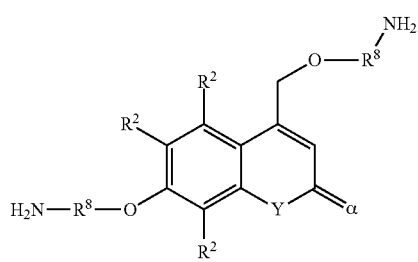

where each $R^2$ is individually a hydrogen atom, a bromine atom, an iodine atom, or an alkoxy group; each $R^8$ is individually an organic group; Y is an oxygen atom or a nitrogen atom with an organic substitution; and α is an oxygen atom or a sulfur atom. In one or more embodiments, the organic group, $R^8$, is a polymeric group. The polymeric group may be a hydrocarbon group or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. In one or more embodiments the polymeric group may include 2 to about 100 repeating mer units, in other embodiments 10 to about 75 mer units, and in other embodiments 20 to about 50 mer units. Polymeric groups suitable for use as the organic group $R^8$, include hydrocarbon polymers, polyethers, polyacrylates, polycarbonates, and polyesters.

In one or more embodiments, a photoresponsive alkoxyphenacyl monomer suitable for use as a soft-segment forming diamine monomer may defined by the formula:

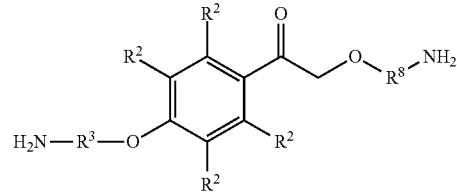

where each $R^2$ is individually a hydrogen atom, a bromine atom, an iodine atom, or an alkoxy group; each $R^8$ is individually a hydrocarbon group.

In one or more embodiments, the organic group, $R^8$, is a polymeric group. The polymeric group may be a hydrocarbon group or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. In one or more embodiments the polymeric group may include 2 to about 100 repeating mer units, in other embodiments 10 to about 75 mer units, and in other embodiments 20 to about 50 mer units. Polymeric groups suitable for use as the organic group $R^8$, include hydrocarbon polymers, polyethers, polyacrylates, polycarbonates, and polyesters.

Suitable polyisocyantes include those compounds that include two or more isocyanate groups. In one or more embodiments, the polyisocyantes have 2 isocyanate groups (which may also be referred to as a diisocyante), in other embodiments the polyisocyantes have 3 isocyanate groups, and in other embodiments polyisocyantes have 4 or more isocyanate groups.

In one or more embodiments, the polyisocyantes may be characterized by molecular weight, which may be determined by the equivalent weight using the isocyante number. In one or more embodiments, the polyisocyantes may have an equivalent molecular weight of at least 30 g/mol, in other embodiments at least 100 g/mol, and in other embodiments at least 150 g/mol. In these or other embodiments, the polyisocyantes may have an equivalent weight of at most 1000 g/mol, in other embodiments at most 300 g/mol and in other embodiments at most 200 g/mol. In one or more embodiments, the polyisocyantes may have an equivalent weight from about 30 g/mol to about 1000 g/mol, in other embodiments from about 100 g/mol to about 300 g/mol in other embodiments, and in other embodiments from about 150 g/mol to about 200 g/mol.

In one or more embodiments, a diisocyante may be defined by the formula:

)=C=N—R$^4$—N=C=O where $R^4$ is a hydrocarbon group. Suitable hydrocarbon groups capable of being an $R^4$ group include linear hydrocarbon, cyclic hydrocarbon, branched hydrocarbon groups, or aromatic groups. In one or more embodiments, the $R^4$ group is a hydrocarbon group from 6 to 15 carbon atoms, in other embodiments, from 7 to 12 carbon atoms, in other embodiments, from 8 to 10 carbon atoms, and in yet other embodiments about 6 carbons.

Exemplary diisocyantes that may be defined by the formula above include methylenebis(phenyl isocyanate) (MDI), toluene diisocyanate (TDI), hexamethylene diisocyanate (HDI), naphthalene diisocyanate (NDI), methylene bis-cyclohexylisocyanate (HMDI)(hydrogenated MDI), isophorone diisocyanate(IPDI), toluene diisocyanate, xylylene diisocyanate, trimethylhexamethylene diisocyanate, para-phenylene diisocyanate, cyclohexyl diisocyanate, tolidene diisocyanate, and dimethyl-diphenylmethane diisocyanate.

As noted above, in some embodiments, a photoresponsive group may be included in a polyisocyantes. In one or more embodiments, where the polyisocyantes is a photoresponsive coumarin diisocyante the polyisocyante may be defined by the formula:

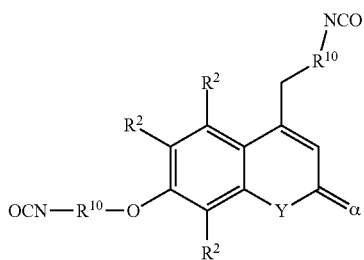

where each $R^2$ is individually a hydrogen atom, a bromine atom, an iodine atom, or an alkoxy group; each $R^{10}$ is individually an organic group; Y is an oxygen atom or a nitrogen atom with an organic substitution; and $\alpha$ is an oxygen atom or a sulfur atom. Suitable hydrocarbon groups capable of being an $R^{10}$ in photoresponsive coumarin diisocyante include linear, cyclic, or branched hydrocarbon groups. In one or more embodiments, the $R^{10}$ is a hydrocarbon group of from 2 to 8 carbons, in other embodiments, from 2 to 6 carbons, and in yet other embodiments, from 2 to 4 carbons.

In one or more embodiments, where the polyisocyantes is a photoreactive alkoxyphenacyl diisocyante the polyisocyantes may be defined by the formula:

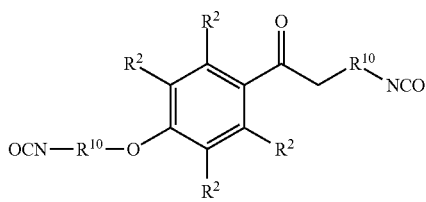

where each $R^2$ is individually a hydrogen atom, a bromine atom, an iodine atom, or an alkoxy group; each $R^{10}$ is individually an organic group; Y is an oxygen atom or a nitrogen atom with an organic substitution; and $\alpha$ is an oxygen atom or a sulfur atom. Suitable hydrocarbon groups capable of being an $R^{10}$ in photoresponsive alkoxyphenacyl diisocyante include linear, cyclic, or branched hydrocarbon groups. In one or more embodiments, the $R^{10}$ is a hydrocarbon group of from 2 to 8 carbons, in other embodiments, from 2 to 6 carbons, and in yet other embodiments, from 2 to 4 carbons.

Suitable chain extenders include those compounds that include two or more reactive groups capable of inclusion into a polyurethane during polymerization. Exemplary groups capable of inclusion into a polyurethane suitable for use in a chain extender include alcohols and primary amine groups. Those skilled in the art appreciate that chain extenders are low-molecular-weight components that primarily serves as a spacer between neighboring polyisocyanates. In one or more embodiments, the chain extender has 2, in other embodiments the chain extender have 3, and in other embodiments chain extender have 4 or more groups capable of inclusion into a polyurethane. Suitable chain extenders include polyols, poly acids, and polyamines.

In one or more embodiments, the chain extender may be characterized by molecular weight, which may be determined by equivalent weight by calculating acid, hydroxyl, or amine numbers In one or more embodiments, the chain extender may have an equivalent weight of at least 20 g/mol, in other embodiments at least 75 g/mol, and in other embodiments at least 100 g/mol. In these or other embodiments, the chain extender may have an equivalent weight of at most 500 g/mol, in other embodiments at most 250 g/mol and in other embodiments at most 200 g/mol. In one or more embodiments, the chain extender may have an equivalent weight from about 20 g/mol to about 500 g/mol, in other embodiments from about 75 g/mol to about 250 g/mol in other embodiments, and in other embodiments from about 100 g/mol to about 200 g/mol.

In one or more embodiments, where the polyol chain extender is a diol, the chain extender may be defined by the formula:

$$HO-R^5-OH$$

where $R^5$ is a hydrocarbon group. Suitable hydrocarbon groups capable of being an $R^5$ group include linear, cyclic, branched hydrocarbon groups, aromatic groups, or polyhydrocarbyl glycols. In one or more embodiments, the $R^5$ group is a hydrocarbon group from 2 to 10 carbon atoms, in other embodiments, from 6 to 8 carbon atoms, and in yet other embodiments about 6 carbons.

Diol compounds suitable for use as a chain extender include, but are not limited to, those selected from the group consisting of ethylene glycol, diethylene glycol, triethylene glycol, tetraethylene glycol, propylene glycol, dipropylene glycol, tripropylene glycol, and 1,4 butane diol.

As noted above, in some embodiments, a photoresponsive group may be included in a polyol chain extender. In one or more embodiments, where a coumarin group or coumarin derivate is included in a diol chain extender, the photoresponsive coumarin monomer defined by the formula:

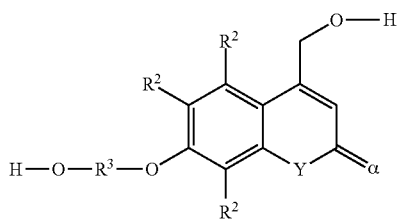

where each $R^2$ is individually a hydrogen atom, a bromine atom, an iodine atom, or an alkoxy group; $R^3$ is a hydrocarbon group; Y is an oxygen atom or a nitrogen atom with an organic substitution; and $\alpha$ is an oxygen atom or a sulfur atom. Suitable hydrocarbon groups capable of being an $R^3$ in the photoresponsive coumarin monomer include linear, cyclic, or branched hydrocarbon groups. In one or more embodiments, the $R^3$ is a hydrocarbon group of from 2 to 8 carbons, in other embodiments, from 2 to 6 carbons, and in yet other embodiments, from 2 to 4 carbons.

In one or more embodiments, where a coumarin group or coumarin derivate is included in a diol chain extender, the photoresponsive coumarin monomer defined by the formula:

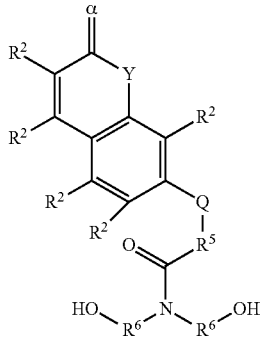

where each $R^2$ is individually a hydrogen atom, a bromine atom, an iodine atom, or an alkoxy group; $R^5$ is a hydrocarbon group; each $R^6$ is individually a hydrocarbon group, Q is an oxygen atom or an amide group; Y is an oxygen atom or a nitrogen atom with an organic substitution; and α is an oxygen atom or a sulfur atom. Suitable hydrocarbon groups capable of being an $R^5$ or an $R^6$ group in the photoresponsive coumarin monomer include linear, cyclic, or branched hydrocarbon groups. In one or more embodiments, each $R^5$ or $R^6$ may individually be a hydrocarbon group of from 2 to 8 carbons, in other embodiments, from 2 to 6 carbons, and in yet other embodiments, from 2 to 4 carbons.

In one or more embodiments, where an alkoxyphenacyl group or an alkoxyphenacyl derivate is included in a diol chain extender, the photoresponsive alkoxyphenacyl monomer defined by the formula:

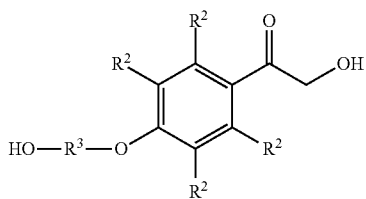

where each $R^2$ is individually a hydrogen atom, a bromine atom, an iodine atom, or an alkoxy group; and $R^3$ is a hydrocarbon group. Suitable hydrocarbon groups capable of being an $R^3$ in the photoresponsive alkoxyphenacyl monomer include linear, cyclic, or branched hydrocarbon groups. In one or more embodiments, the $R^3$ is a hydrocarbon group of from 2 to 8 carbons, in other embodiments, from 2 to 6 carbons, and in yet other embodiments, from 2 to 4 carbons.

In one or more embodiments, where an alkoxyphenacyl group or an alkoxyphenacyl derivate is included in a diol chain extender, the photoresponsive alkoxyphenacyl monomer defined by the formula:

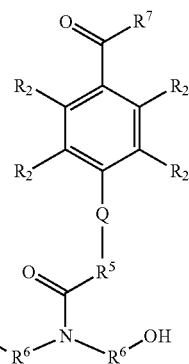

where each $R^2$ is individually a hydrogen atom, a bromine atom, an iodine atom, or an alkoxy group; $R^5$ is a hydrocarbon group; each $R^6$ is individually a hydrocarbon group, $R^7$ is a hydrocarbon group, and Q is an oxygen atom or an amide group. Suitable hydrocarbon groups capable of being an $R^5$, $R^6$, or an $R^7$ group in the photoresponsive alkoxyphenacyl monomer include linear, cyclic, or branched hydrocarbon groups. In one or more embodiments, each $R^5$, $R^6$, or an $R^7$ may individually be a hydrocarbon group of from 2 to 8 carbons, in other embodiments, from 2 to 6 carbons, and in yet other embodiments, from 2 to 4 carbons.

In one or more embodiments, where the polyamine chain extender is a diamine, the chain extender may be defined by the formula:

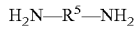

$$H_2N-R^5-NH_2$$

where $R^5$ is a hydrocarbon group. Suitable hydrocarbon groups capable of being an $R^5$ group include linear, cyclic, branched hydrocarbon groups, aromatic groups, or polyhydrocarbyl glycols. In one or more embodiments, the $R^5$ group is a hydrocarbon group from 2 to 10 carbon atoms, in other embodiments, from 6 to 8 carbon atoms, and in yet other embodiments about 6 carbons.

Diamine compounds suitable for use as a chain extender include, but are not limited to, those selected from the group consisting of diethyl toluene diamine, ethacure, and jefflink diamines.

As noted above, in some embodiments, a photoresponsive group may be included in a polyamine chain extender. In one or more embodiments, where a coumarin group or coumarin derivate is included in a diamine chain extender, the photoresponsive coumarin monomer defined by the formula

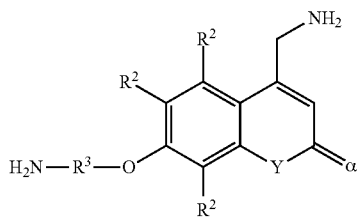

where each $R^2$ is individually a hydrogen atom, a bromine atom, an iodine atom, or an alkoxy group; $R^3$ is a hydrocarbon group; Y is an oxygen atom or a nitrogen atom with an organic substitution; and α is an oxygen atom or a sulfur atom. Suitable hydrocarbon groups capable of being an $R^3$ in the photoresponsive coumarin monomer include linear, cyclic, or branched hydrocarbon groups. In one or more embodiments, the $R^3$ is a hydrocarbon group of from 2 to 8 carbons, in other embodiments, from 2 to 6 carbons, and in yet other embodiments, from 2 to 4 carbons.

In one or more embodiments, where a coumarin group or coumarin derivate is included in a diamine chain extender, the photoresponsive coumarin monomer defined by the formula

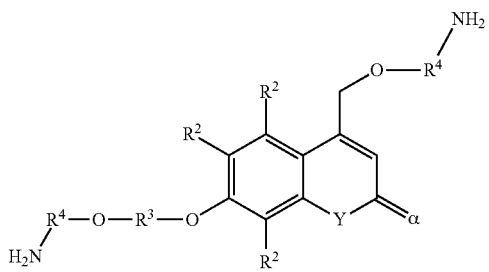

where each $R^2$ is individually a hydrogen atom, a bromine atom, an iodine atom, or an alkoxy group; $R^3$ is a hydrocarbon group; each $R^4$ is individually a hydrocarbon group; Y is an oxygen atom or a nitrogen atom with an organic substitution; and α is an oxygen atom or a sulfur atom. Suitable hydrocarbon groups capable of being an $R^3$ or an $R^4$ in the photoresponsive coumarin monomer include linear, cyclic, or branched hydrocarbon groups. In one or more embodiments, each $R^3$ or an $R^4$ is individually a hydrocarbon group of from 2 to 8 carbons, in other embodiments, from 2 to 6 carbons, and in yet other embodiments, from 2 to 4 carbons.

In one or more embodiments, where an alkoxyphenacyl group or alkoxyphenacyl derivate is included in a diamine chain extender, the photoresponsive alkoxyphenacyl monomer defined by the formula

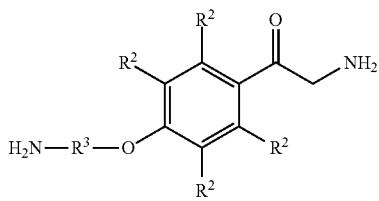

where each $R^2$ is individually a hydrogen atom, a bromine atom, an iodine atom, or an alkoxy group; and $R^3$ is a hydrocarbon group. Suitable hydrocarbon groups capable of being an $R^3$ in the photoresponsive alkoxyphenacyl monomer include linear, cyclic, or branched hydrocarbon groups. In one or more embodiments, the $R^3$ is a hydrocarbon group of from 2 to 8 carbons, in other embodiments, from 2 to 6 carbons, and in yet other embodiments, from 2 to 4 carbons.

In one or more embodiments, where an alkoxyphenacyl group or alkoxyphenacyl derivate is included in a diamine chain extender, the photoresponsive alkoxyphenacyl monomer defined by the formula

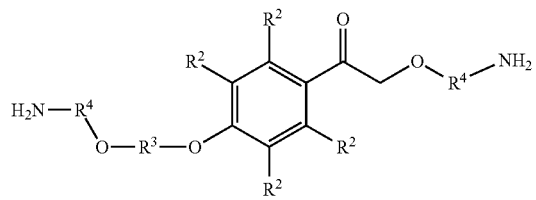

where each $R^2$ is individually a hydrogen atom, a bromine atom, an iodine atom, or an alkoxy group; $R^3$ is a hydrocarbon group, each $R^4$ is individually a hydrocarbon group. Suitable hydrocarbon groups capable of being an $R^3$ or an $R^4$ in the photoresponsive coumarin monomer include linear, cyclic, or branched hydrocarbon groups. In one or more embodiments, each $R^3$ or an $R^4$ is individually a hydrocarbon group of from 2 to 8 carbons, in other embodiments, from 2 to 6 carbons, and in yet other embodiments, from 2 to 4 carbons.

In one or more embodiments, a photoresponsive polyurethane may be prepared in an isocyanate-free polymerization. In these or other embodiments, a method of preparing a photoresponsive polyurethane comprises reacting a poly (cylic carbonate) with a polyamine compound, wherein the poly(cylic carbonate), the polyamine compound, or both the poly(cylic carbonate) and the polyamine compound include a photoresponsive group that is selected from a coumarin group or coumarin derivative and an alkoxyphencyl group or an alkoxyphenacyl derivative.

In one or more embodiments, where the polyamine compound of the isocyanate-free polymerization results in a soft segment of the photoresponsive polyurethane, the polyamine compound may be a polyamine suitable for use in the soft segment as described above. In other embodiments, where the polyamine compound of the isocyanate-free polymerization results in a hard segment of the photoresponsive polyurethane, the polyamine compound may be a polyamine suitable for use in a chain extender as described above. Exemplary reactions conditions are disclosed in Kathalewar, et al., Non-isocyanate polyurethanes: from chemistry to applications, RSC Adv., 2013, 3, 4110-4129, which is incorporated herein by reference.

In one or more embodiments, a poly(cylic carbonate) may be defined by the formula

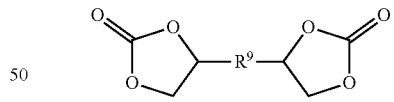

Where $R^9$ is an organic group. In one or more embodiments, the organic group, $R^9$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units. Polymeric groups suitable for use as the organic group $R^9$, include hydrocarbon polymers, polyethers, polyacrylates, polycarbonate, and polyesters.

In one or more embodiments, where the poly(cylic carbonate) includes a coumarin group, the poly(cylic carbonate) defined by the formula:

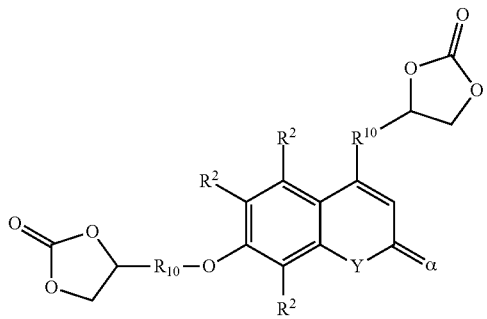

where each $R^2$ is individually a hydrogen atom, a bromine atom, an iodine atom, or an alkoxy group; each $R^{10}$ is individually an organic group; Y is an oxygen atom or a nitrogen atom with an organic substitution; and α is an oxygen atom or a sulfur atom. In one or more embodiments, the organic group, $R^{10}$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units. Polymeric groups suitable for use as the organic group $R^{10}$, include hydrocarbon polymers, polyethers, polyacrylates, polycarbonate, and polyesters.

In one or more embodiments, where the poly(cylic carbonate) includes an alkoxyphenacyl group, the poly(cylic carbonate) defined by the formula:

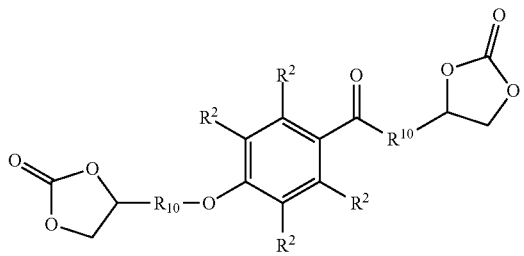

where each $R^2$ is individually a hydrogen atom, a bromine atom, an iodine atom, or an alkoxy group; and each $R^{10}$ is individually an organic group. In one or more embodiments, the organic group, $R^{10}$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units. Polymeric groups suitable for use as the organic group $R^{10}$, include hydrocarbon polymers, polyethers, polyacrylates, polycarbonate, and polyesters.

In one or more embodiments, the photoresponsive polyurethane may be characterized by the polymer's molecular weight, which may be determined by gel permeation chromatography (GPC). In one or more embodiments, the photoresponsive polyurethane is characterized by a molecular weight that is at least 4000 g/mol, in other embodiments at least 20,000 g/mol, and in other embodiments at least 40,000 g/mol. In these or other embodiments, the photresponsive polyurethane is characterized by a molecular weight that is at most 60,000 g/mol, in other embodiments at most 160,000 g/mol, and in other embodiments at most 400,000 g/mol. In certain embodiments the photresponsive polyurethane may be characterized by a molecular weight that is from about 4,000 to about 400,000, in other embodiments from about 20,000 g/mol to about 160,000 g/mol, and in other embodiments from about 40,000 g/mol to about 60,000 g/mol.

In one or more embodiments, the photresponsive polyurethane unit may be characterized by the average number of photoresponsive groups units within a polymer chain. In one or more embodiments, the photoresponsive polyurethane unit is characterized by an average number of photresponsive groups within a polymer chain that is at least 20, in other embodiments at least 50, and in other embodiments at least 70. In these or other embodiments, the photresponsive polyurethane is characterized by an average number of photresponsive groups within a polymer chain that is at most 120, in other embodiments at most 150, and in other embodiments at most 250. In certain embodiments the polymer photresponsive polyurethane may be characterized by an average number of photresponsive groups within a polymer chain that is from about 20 to about 250, in other embodiments from about 50 to about 150, and in other embodiments from about 70 to about 250.

In one or more embodiments, the photoresponsive polyurethane may be characterized by a glass transition temperature (Tg), which may be determined by differential scanning calorimetry (DSC). In one or more embodiments, the photoresponsive polyurethane may have a glass transition temperature weight of at least −50° C. in other embodiments at least −10° C., and in other embodiments at least 30° C. In these or other embodiments, the photoresponsive polyurethane may have a glass transition temperature of at most 200° C., in other embodiments at most 100° C., and in other embodiments at most 70° C. In one or more embodiments, the photoresponsive polyurethane may have a glass transition temperature from about −50° C. to about 200° C., in other embodiments from about −10° C. to about 100° C., and in other embodiments from about 30° C. to about 70° C.

Those skilled in the art will appreciate that certain end uses of the photoresponsive polyurethane may require different glass transition temperatures. In one or more embodiments, where the photoresponsive polyurethane is a pressure sensitive adhesive the photoresponsive polyurethane may have a glass transition temperature from about −50° C. to about 10° C. In other embodiments, where the photoresponsive polyurethane is elastomer, the the photresponsive polyurethane may have a glass transition temperature from about 30° C. to about 70° C. In other embodiments, where the photoresponsive polyurethane is a coating, the photoresponsive polyurethane may have a glass transition temperature from about 10° C. to about 100° C.

In one or more embodiments, the photoresponsive polyurethane may include a coumarin group defined by the formula:

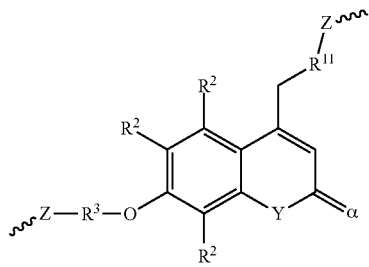

where each $R^2$ is individually a hydrogen atom, a bromine atom, an iodine atom, or an alkoxy group; $R^3$ is an organic group, $R^{11}$ is a bond or an organic group, hydrocarbon group; Y is an oxygen atom or a nitrogen atom with an organic substitution; each Z is individually a urethane group or a urea group; and α is an oxygen atom or a sulfur atom.

In one or more embodiments, the organic group, $R^3$ and $R^{11}$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units.

In one or more embodiments, the photoresponsive polyurethane may include a coumarin group defined by the formula:

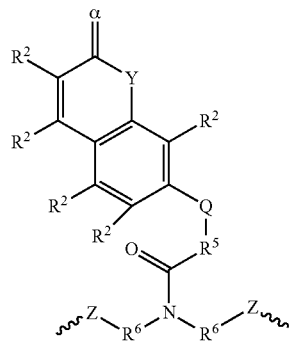

where each $R^2$ is individually a hydrogen atom, a bromine atom, an iodine atom, or an alkoxy group; $R^5$ is a hydrocarbon group; each $R^6$ is individually a hydrocarbon group, Q is an oxygen atom or an amide group; Y is an oxygen atom or a nitrogen atom with an organic substitution; each Z is individually a urethane group or a urea group; and α is an oxygen atom or a sulfur atom. Suitable hydrocarbon groups capable of being an $R^5$ or an $R^6$ group in the photoresponsive coumarin monomer include linear, cyclic, or branched hydrocarbon groups. In one or more embodiments, each $R^5$ or $R^6$ may individually be a hydrocarbon group of from 2 to 8 carbons, in other embodiments, from 2 to 6 carbons, and in yet other embodiments, from 2 to 4 carbons.

In one or more embodiments, the photoresponsive polyurethane may include an alkoxyphencyl group defined by the formula:

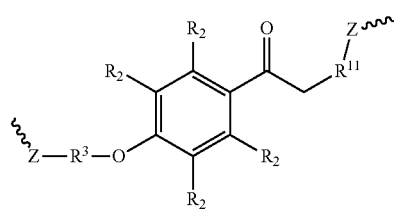

where each $R^2$ is individually a hydrogen atom, a bromine atom, an iodine atom, or an alkoxy group; each Z is individually a urethane group or a urea group; $R^{11}$ is a bond or an organic group and $R^3$ is an organic group. In one or more embodiments, the organic group, $R^3$, may be a hydrocarbon groups or a substituted hydrocarbon group. Substituted hydrocarbon groups include those hydrocarbons where a hydrogen or carbon atom has been replaced by heteroatom. Suitable heteroatoms include, but are not limited to, oxygen, sulfur, nitrogen atoms, and halogens such as fluorine and chlorine. The organic group may linear, cyclic, branched, or aromatic. In certain embodiments, where the organic groups is a small organic group the hydrocarbon group or substituted hydrocarbon groups may include 1 to about 12 carbon atoms, in other embodiments 2 to about 10 carbon atoms, and in other embodiments 3 to about 8 carbon atoms. In certain embodiments, where the organic groups is polymeric, the group may include 2 to about 100 repeating mer units, in other embodiments 10 to about 75 mer units, and in other embodiments 20 to about 50 mer units.

In one or more embodiments, the photoresponsive polyurethane may include an alkoxyphencyl group defined by the formula:

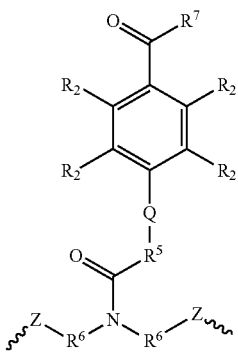

where each $R^2$ is individually a hydrogen atom, a bromine atom, an iodine atom, or an alkoxy group; $R^5$ is a hydrocarbon group; each $R^6$ is individually a hydrocarbon group, $R^7$ is a hydrocarbon group, each Z is individually a urethane group or a urea group and Q is an oxygen atom or an amide group. Suitable hydrocarbon groups capable of being an $R^5$, $R^6$, or an $R^7$ group in the photoresponsive alkoxyphenacyl monomer include linear, cyclic, or branched hydrocarbon groups. In one or more embodiments, each $R^5$, $R^6$, or an $R^7$ may individually be a hydrocarbon group of from 2 to 8 carbons, in other embodiments, from 2 to 6 carbons, and in yet other embodiments, from 2 to 4 carbons.

As noted above, a photoresponsive polyurethane may comprise a hard segment, a soft segment, and a photoresponsive group that is selected from a coumarin group and an alkoxyphencyl group. The photoresponsive polyurethane may be have various uses such as coatings or adhesives.

In one or more embodiments, where the photoresponsive polyurethane is a included in an adhesive, the photoresponsive groups of the polyurethane may be reversibly linked to control the strength of the adhesive. For the purpose of this disclosure, a polyurethane that includes a photoresponsive group used as an adhesive polymer may simply be referred to as a photoresponsive adhesive. By varying composition, polymerization techniques and the molecular weight, photoresponsive adhesives may be used as water-based adhesives, solvent based adhesives, or hot melt adhesives.

In one or more embodiments, the photoresponsive adhesive may be used as a single-component adhesive. Single-component adhesives are advantageous because they include a built in crosslinker. Generally, single-component adhesives are more convenient than multi-component adhesives, because adhesive and crosslinker of a multi-component adhesives must be stored separately. Additionally, quality control issues may arise from poorly mixed multi-component adhesives or multi-component adhesives that use incorrect ratios of components.

In one or more embodiment, the photoresponsive adhesive may be a hot melt adhesive. Hot melt adhesive possesses the reversible properties of strong cohesive strength at ambient temperature and desirable melt viscosity at elevated temperatures. In one or more embodiments, a photoresponsive adhesive with strong secondary bonding such as hydrogen bonding and supramolecular coupling may be used as a hot melt adhesive.

In one or more embodiments, the photoresponsive adhesive may have a high adhesive strength conformation and a low adhesive strength conformation. In one or more embodiments, the high adhesive conformation is where the photoresponsive adhesive is crosslinked and in the low adhesive conformation the crosslinks are broken. The strength of the may be measured by a peel test. In one or more embodiments the high strength conformation is at least 2 times stronger, in other embodiments at least 3 times stronger, in other embodiments at least 4 times stronger, and in still other embodiments at least 5 times stronger than the low strength conformation. In one or more embodiments, the high strength conformation is at most 100 times stronger, in other embodiments at most 50 times stronger, in other embodiments at most 20 times stronger, and in still other embodiments at most 10 times stronger than the low strength conformation. In these or other embodiments, the high strength conformation from about 2 times to about 100 times stronger, in other embodiments from about 3 times to about 50 times stronger, in other embodiments from about 4 times to about 20 times stronger, and in still other embodiments from about 5 times to about 10 times stronger than the low strength conformation.

The photoresponsive adhesives may be applied to a variety of substrates, including paper, cardboard, wood, glass, and metal. Due to photoresponsive nature of the photoresponsive adhesives, the photoresponsive adhesive may be applied to transparent or partially transparent substrate. The transparent or partially transparent substrate may be completely transparent or transparent to at least one wavelength that allows the photoresponsive group to alter the strength properties of the photoresponsive adhesive. In one or more embodiments, a photoresponsive adhesive in a high strength conformation may be used to attach a transparent or partially transparent substrate to a surface. Advantageously, the transparent or partially transparent substrate allows for light to pass to the photoresponsive adhesive to switch the photoresponsive adhesive to a low strength conformation, allowing the substrate to be removed from the surface easily. In these or other embodiments, a removable light occlusive layer may be attached to the transparent or partially transparent substrate to prevent the photoresponsive adhesive from prematurely switching to a low strength conformation.

In one or more embodiments, the photoresponsive adhesive may be used as an adhesive in a medical device. Medical dressings are described in U.S. Pat. Pub. 2013/0017246, which is incorporated herein. In one or more embodiments, a medical dressing may comprise a transparent or partially transparent backing layer with a first and a second side; and a pressure sensitive adhesive polymer comprising crosslinked adhesive polymers with a crosslinker that includes a photoresponsive group coasted on the first side of the backing layer. In these or other embodiments, the medical dressing may include a removable light occlusive layer attached to the second side of the transparent or partially transparent backing layer.

As noted above, the photoresponsive polyurethane are particularly useful as coatings. The photoresponsive polyurethane may be used to provide stimuli responsive coating on a wide array of substrates. Exemplary substrates include silica oxide, glass, ceramics, or metals such as aluminum or stainless steel.

In addition to the photoresponsive polyurethane, photoresponsive polyurethane coatings may include a solvent. Suitable solvents include DCM, MEK, and THF. Other components that may be used in a photoresponsive polyurethane coating include solid fillers, pigments, dyes, antioxidants, tougheners, surfactants, coupling agents, coalescing agents, catalysts, defoamers, moisture scavengers, water, plasticizers, hybridizing polymers, and combinations thereof.

In one or more embodiments, the photoresponsive polyurethane may be applied as a coating to the substrate in the low strength conformation. After the photoresponsive polyurethane coating applied to the substrate, the photoresponsive polyurethane coating is then irradiated to induce the photoresponsive polyurethane to change to the high strength conformation. In other embodiments, the photoresponsive polyurethane may be applied as a coating to the substrate in the high strength conformation. After the photoresponsive polyurethane coating applied to the substrate, the photoresponsive polyurethane coating is then irradiated to induce the photoresponsive polyurethane to change to the low strength conformation. The photoresponsive polyurethane coating may be applied to the substrate by various means including flow-coating, draw-down bar, doctor blade, dip coating, spraying, and spin-coating.

While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Example 1

20% Chain Extender

PPG2000 (polypropylene glycol, Mn~2000 1.6 gms) and IPDI (Isophorone diisocyanate, 0.22 gms) were added to a schlenk tube equipped with a stir bar. The tube was vacuumed and refilled with $N_2$ three times. The mixture was stirred at 78° C. for 2 hours under protection of nitrogen. The mixture was cooled down to 40° C., followed by addition of 5.5 ml of MEK solution which dissolved 8.9 mg of TMP (trimethylolpropane) and 21 mg of AJ-5 ((2-Hydroxy-1-(4-(3-hydroxypropoxy)phenyl)ethanone)). The mixture was stirred at 78° C. for 16 hours. The mixture was purified by dialysis against methanol. Hereafter this PU formulation is denoted as w/20% Chain extender.

Example 2

35% Chain Extender

PPG2000 (polypropylene glycol, Mn-2000 3.9 gms) and IPDI (Isophorone diisocyanate, 0.67 gms) were added to a schlenk tube equipped with a stir bar. The tube was vacuumed and refilled with $N_2$ three times. The mixture was stirred at 78° C. for 2 hours under protection of nitrogen. The mixture was cooled down to 40° C., followed by addition of 8 ml of MEK solution which dissolved 47 mg of TMP (trimethylolpropane) and 110 mg of AJ-5 ((2-Hydroxy-1-(4-(3-hydroxypropoxy)phenyl)ethanone)). The mixture was stirred at 78° C. for 16 hours. The mixture was purified by dialysis against methanol. Hereafter this PU formulation is denoted as w/35% Chain extender.

Sample Prep and Testing: The polyurethanes were made up into 50% by weight solutions in MEK and coated on 2 mil PP sheets using a drawdown coater. The final thickness of the adhesive on the film was 37±3 µm. Testing was carried out using a TA Texture analyzer where the adhesives were coated on quartz substrates and dwelled for 20 mins before peel testing. 180 degrees Peel Test was carried out at 300 mm/min. UV irradiation was carried out in a Rayonet reactor using 300 nm bulbs for 5 mins. The intensity of the Ray onet reactor at the center was 5.34 mW/cm2

PhotoChemistry of Alkoxyphenacyl: It is found that the photochemistry of alkoxyphenacyl compounds vary under certain conditions where there is chain scission in the presence of hydroxyl groups/water/moisture in the system and there is radical transfer to other sites in the matrix in the absence of moisture.

The invention claimed is:

1. A photoresponsive polyurethane comprising a hard segment, and a soft segment, where the photoresponsive polyurethane includes a coumarin group or a coumarin derivative defined by the formula:

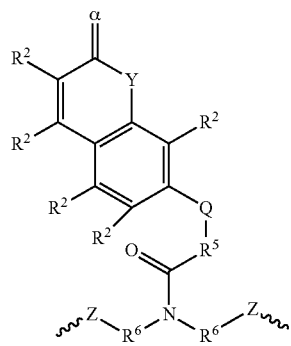

where each $R^2$ is individually a hydrogen atom, a bromine atom, an iodine atom, or an alkoxy group; $R^5$ is a hydrocarbon group; each $R^6$ is individually a hydrocarbon group, Q is an oxygen atom or an amide group; Y is an oxygen atom, an oxygen-containing organic group, a nitrogen atom, or a nitrogen-containing organic group; each Z is individually a urethane group or a urea group; and a is an oxygen atom or a sulfur atom.

2. A photoresponsive polyurethane comprising a hard segment, a soft segment, and a photoresponsive group, where the photoresponsive group is an alkoxyphenacyl group or an alkoxyphenacyl derivative.

3. The photoresponsive polyurethane of claim 2, where the photoresponsive polyurethane includes an alkoxyphenacyl group or an alkoxyphenacyl derivative as part of the hard segment.

4. The photoresponsive polyurethane of claim 2, where the photoresponsive polyurethane includes an alkoxyphenacyl group or an alkoxyphenacyl derivative as part of the soft segment.

5. The photoresponsive polyurethane of claim 2, where the photoresponsive polyurethane includes an alkoxyphenacyl group or an alkoxyphenacyl derivative as a terminating group.

6. The photoresponsive polyurethane of claim 2, where the photoresponsive polyurethane includes an alkoxyphenacyl group or an alkoxyphenacyl derivative defined by the formula:

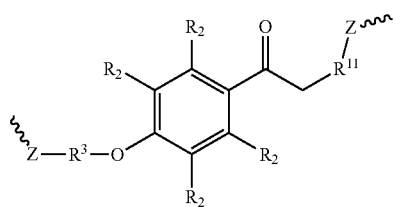

where each $R^2$ is individually a hydrogen atom, a bromine atom, an iodine atom, or an alkoxy group; each Z is individually a urethane group or a urea group; $R^{11}$ is a bond or an organic group and $R^3$ is an organic group.

7. The photoresponsive polyurethane of claim 2, where the photoresponsive polyurethane includes an alkoxyphenacyl group or an alkoxyphenacyl derivative defined by the formula:

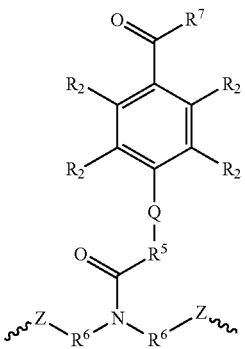

where each $R^2$ is individually a hydrogen atom, a bromine atom, an iodine atom, or an alkoxy group; $R^5$ is a hydrocarbon group; each $R^6$ is individually a hydrocarbon group, $R^7$ is a hydrocarbon group, each Z is individually a urethane group or a urea group and Q is an oxygen atom or an amide group.

8. A coated article comprising
a photoresponsive polyurethane coated on a substrate, wherein the photoresponsive polyurethane comprises
a hard segment, and
a soft segment,
wherein the soft segment includes a photoresponsive group that is a coumarin group or an alkoxyphenacyl group, or wherein the hard segment includes an alkoxyphenacyl group.

* * * * *